US011061400B2

(12) United States Patent
Ueno

(10) Patent No.: US 11,061,400 B2
(45) Date of Patent: Jul. 13, 2021

(54) CONTROL APPARATUS FOR VEHICLE

(71) Applicant: TOYOTA JIDOSHA KABUSHIKI KAISHA, Toyota (JP)

(72) Inventor: Koki Ueno, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 374 days.

(21) Appl. No.: 16/237,280

(22) Filed: Dec. 31, 2018

(65) Prior Publication Data
US 2019/0220006 A1    Jul. 18, 2019

(30) Foreign Application Priority Data

Jan. 15, 2018    (JP) .............................. JP2018-004559

(51) Int. Cl.
| G05D 1/00 | (2006.01) |
| G01C 21/20 | (2006.01) |
| B60W 20/50 | (2016.01) |
| F16H 61/12 | (2010.01) |
| F16H 63/34 | (2006.01) |
| B60W 50/029 | (2012.01) |
| F16H 59/10 | (2006.01) |
| G05D 1/02 | (2020.01) |
| B60K 6/547 | (2007.10) |

(52) U.S. Cl.
CPC .......... *G05D 1/0061* (2013.01); *B60W 20/50* (2013.01); *B60W 50/029* (2013.01); *F16H 59/105* (2013.01); *F16H 61/12* (2013.01); *F16H 63/3491* (2013.01); *G01C 21/20* (2013.01); *G05D 1/0055* (2013.01); *G05D 1/021* (2013.01); *B60K 6/547* (2013.01); *B60Y 2200/92* (2013.01); *F16H 2061/1256* (2013.01); *G05D 2201/0213* (2013.01)

(58) Field of Classification Search
CPC .... G05D 1/0061; G05D 1/0055; G05D 1/021; G05D 2201/0213; B60W 10/10; B60W 50/029; B60W 20/50; G01C 21/20; F16H 2061/1268; F16H 2061/1284; F16H 59/105; F16H 61/12; F16H 63/3491; F16H 2061/1256; B60K 6/547; B60Y 2200/92

See application file for complete search history.

(56) References Cited

U.S. PATENT DOCUMENTS

| 8,914,185 | B2 * | 12/2014 | Ueno | ...................... F16H 61/12 |
| | | | | 701/29.2 |
| 2010/0318271 | A1 * | 12/2010 | Nishide | ................... F16H 61/12 |
| | | | | 701/62 |
| 2011/0137534 | A1 * | 6/2011 | Kim | ...................... F16H 59/105 |
| | | | | 701/62 |
| 2011/0202231 | A1 | 8/2011 | Ueno et al. | |

(Continued)

FOREIGN PATENT DOCUMENTS

| CN | 102086931 A | 6/2011 |
| CN | 102333976 A | 1/2012 |

(Continued)

*Primary Examiner* — Richard M Camby
(74) *Attorney, Agent, or Firm* — Oliff PLC

(57) ABSTRACT

A control apparatus for a vehicle makes the vehicle travel without depending on operation of a shift operation apparatus by a driver, even in a case where a detection abnormality by which a shift operation position of the shift operation apparatus becomes indefinite has occurred.

13 Claims, 7 Drawing Sheets

(56) References Cited

U.S. PATENT DOCUMENTS

| | | |
|---|---|---|
| 2013/0252784 A1 | 9/2013 | Kinoshita et al. |
| 2015/0134178 A1 | 5/2015 | Minoiu-Enache |
| 2016/0297431 A1 | 10/2016 | Eigel et al. |
| 2019/0031202 A1* | 1/2019 | Takeda .................... B60T 8/171 |

FOREIGN PATENT DOCUMENTS

| | | |
|---|---|---|
| CN | 103318151 A | 9/2013 |
| EP | 1450077 A2 | 8/2004 |
| JP | 2006-336717 A | 12/2006 |
| JP | 2014-024368 A | 2/2014 |
| JP | 5618004 B2 | 11/2014 |
| JP | 2016-200986 A | 12/2016 |
| JP | 2017-177945 A | 10/2017 |
| JP | 2017-223467 A | 12/2017 |
| KR | 10-2016-0120246 A | 10/2016 |
| WO | 2010/097936 A1 | 9/2010 |
| WO | 2013/150244 A1 | 10/2013 |

\* cited by examiner

CONTROL APPARATUS FOR VEHICLE

INCORPORATION BY REFERENCE

The disclosure of Japanese Patent Application No. 2018-004559 filed on Jan. 15, 2018 including the specification, drawings and abstract is incorporated herein by reference in its entirety.

BACKGROUND

1. Technical Field

The disclosure relates to a control apparatus that performs a limp home control for a vehicle when an abnormality occurs in a shift operation apparatus.

2. Description of Related Art

A control apparatus for a vehicle that includes a control device and an abnormality determination device is known. The control device switches a traveling range based on an operation position of a shift operation apparatus that is operated by a driver. The operation position is detected by an operation position sensor. The abnormality determination device determines whether a detection abnormality by which the operation position of the shift operation apparatus becomes indefinite has occurred. As the control apparatus for the vehicle, there is a control apparatus for a vehicle described in International Publication No. WO 2010/097936. In the description of WO 2010/097936, in the case where the occurrence of the detection abnormality of the operation position sensor is determined during traveling, the current traveling range is maintained until the operation of the shift operation apparatus by the driver is detected, and when the operation of the shift operation apparatus by the driver is detected, the traveling range of the shift transmission device is switched to a neutral range (N range) that is a power transmission blockage range. Thereby, the vehicle travels in a limp home mode, while avoiding an unintended forward-rearward switching at the time of the abnormality of the operation position sensor.

SUMMARY

In WO 2010/097936, in the case where the shift operation apparatus is operated when the operation position cannot be identified due to the abnormality of the operation position sensor, the traveling range is switched to the neutral range such that an unintended forward-rearward switching due to a false detection does not occur. Therefore, it is difficult to maintain the traveling in the limp home mode until the vehicle moves to an appropriate evacuation place.

The disclosure provides a control apparatus for a vehicle that can maintain the traveling in the limp home mode to an appropriate evacuation place even when the detection abnormality of the shift operation apparatus occurs.

A control apparatus for a vehicle in a first aspect of the disclosure includes a control device, an abnormality determination device and a limp home control device. The control device switches a traveling range of the vehicle based on an operation position of a shift operation apparatus that is operated by a driver. The operation position is detected by an operation position detection apparatus. The abnormality determination device determines whether a detection abnormality of the operation position detection apparatus has occurred. The limp home control device executes a limp home control by which the vehicle travels without depending on operation of the shift operation apparatus, in a case where the abnormality determination device determines that the detection abnormality of the operation position detection apparatus has occurred during vehicle traveling.

With this control apparatus, even in the case where the abnormality determination device determines that the detection abnormality of the operation position detection apparatus has occurred, the vehicle travels without depending on the operation of the shift operation apparatus by the driver, and therefore, it is possible to continue the traveling in a limp home mode.

The control apparatus may further include a notification device to notify the driver that the limp home control is able to be executed, in a case where the abnormality determination device determines that the detection abnormality of the operation position detection apparatus has occurred. The limp home control device may execute the limp home control after the notification by the notification device.

With this control apparatus, in the case where the abnormality determination device determines that the detection abnormality of the operation position detection apparatus has occurred, the driver is notified that the limp home control is able to be executed. Therefore, in the case of the occurrence of the detection abnormality, the driver can recognize that the limp home control is able to be executed.

In the control apparatus, the limp home control device may continue automatic driving in a case where the abnormality determination device determines that the detection abnormality of the operation position detection apparatus has occurred during the automatic driving.

With this control apparatus, in the case where the abnormality determination device determines that the detection abnormality of the operation position detection apparatus has occurred during the automatic driving, the limp home control device continuously executes the automatic driving. Therefore, it is possible to continue the traveling in the limp home mode by the automatic driving.

The control apparatus may include a stop state determination device and an input permission device. The stop state determination device may determine whether the vehicle is in a stop state, in a case where the abnormality determination device determines that the detection abnormality of the operation position detection apparatus has occurred. The input permission device may permit input of a destination in the limp home control in a case where the stop state determination device determines that the vehicle is in the stop state. When the destination is input, the limp home control device may make the vehicle travel to the input destination.

With this control apparatus, in the case where the abnormality determination device determines that the detection abnormality of the operation position detection apparatus has occurred and where the stop state determination device determines that the vehicle is in the stop state, the input of the destination is permitted. Therefore, the input of the destination is performed during the vehicle stop, allowing the input of the destination in a safe state. Further, by the input of the destination, the vehicle can travel to the destination, in the limp home mode.

The control apparatus may further include a switching determination device. The switching determination device may determine whether a switching to automatic driving has been performed by the driver after the abnormality determination device has determined that the detection abnormality of the operation position detection apparatus has occurred. The limp home control device may make the vehicle travel by the automatic driving in a case where the switching determination device determines that the switching to the automatic driving has been performed.

With this control apparatus, in the case where the switching to the automatic driving has been performed by the driver, the automatic driving is executed. Therefore, the driver can select whether to execute the automatic driving.

The control apparatus may further include a pathway guidance apparatus. The pathway guidance apparatus may set a traveling pathway to a destination. When the destination is input to the pathway guidance apparatus, the limp home control device may make the vehicle travel to the input destination in a case where the abnormality determination device determines that the detection abnormality of the operation position detection apparatus has occurred.

With this control apparatus, in the case where the abnormality determination device determines that the detection abnormality of the operation position detection apparatus has occurred and where the destination is input to the pathway guidance apparatus, the vehicle travels to the destination. Therefore, without stopping, the vehicle can travel to the destination in the limp home mode.

In the control apparatus, the limp home control device may retrieve a temporary evacuation place in a case where the abnormality determination device determines that the detection abnormality of the operation position detection apparatus has occurred.

With the control apparatus, in the case where the abnormality determination device determines the detection abnormality of the operation position detection apparatus, the limp home control device retrieves the temporary evacuation place. Therefore, the driver selects the retrieved temporary evacuation place as the destination, and thereby, can make the vehicle travel to the temporary evacuation place.

The control apparatus may further include a traveling position determination device. The traveling position determination device may determine whether a road on which the vehicle is traveling is a freeway. The limp home control device may make the vehicle travel toward the temporary evacuation place set on the 10 freeway, in a case where the traveling position determination device determines that the road on which the vehicle is traveling is the freeway.

With this control apparatus for the vehicle, in the case where the abnormality determination device determines the detection abnormality during the traveling on the freeway, the vehicle travels toward the temporary evacuation place set on the freeway. Therefore, the vehicle can continue the traveling in the limp home mode to a safe place, without stopping in the middle of the freeway.

In the control apparatus, the limp home control device may perform a fixation of the vehicle after a stop with an electric parking brake in a case where the abnormality determination device determines that the detection abnormality of the operation position detection apparatus has occurred due to an abnormality of a shift control unit that executes a switching control for the traveling range of the vehicle.

With this control apparatus, in the case where the abnormality of the shift control unit has occurred, a parking operation is executed by the electric parking brake. Therefore, even when a parking lock mechanism is not actuated due to a failure of the shift control unit, it is possible to prevent movement of the vehicle after the parking.

In the control apparatus, the shift control unit may actuate a parking lock mechanism that mechanically stops rotation of a drive wheel, and switch the traveling range of the vehicle to a parking range.

In the case of the occurrence of the abnormality of the shift control unit, it is difficult to actuate the parking lock mechanism and switch the traveling range to the parking range. However, with this control apparatus, it is possible to prevent the movement of the vehicle after the parking by actuating the electric parking brake.

In the control apparatus, the limp home control device may execute an automatic driving control based on destination information and current position information.

With this control apparatus, in the case of the occurrence of the detection abnormality of the operation position of the shift operation apparatus, the vehicle performs the automatic driving based on the destination information and the current position information, so that the vehicle continuously travels.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings. In the embodiments described below, the drawings are simplified or modified when appropriate, and the dimensional ratio and shape of each part are not always drawn exactly.

Figure 1:
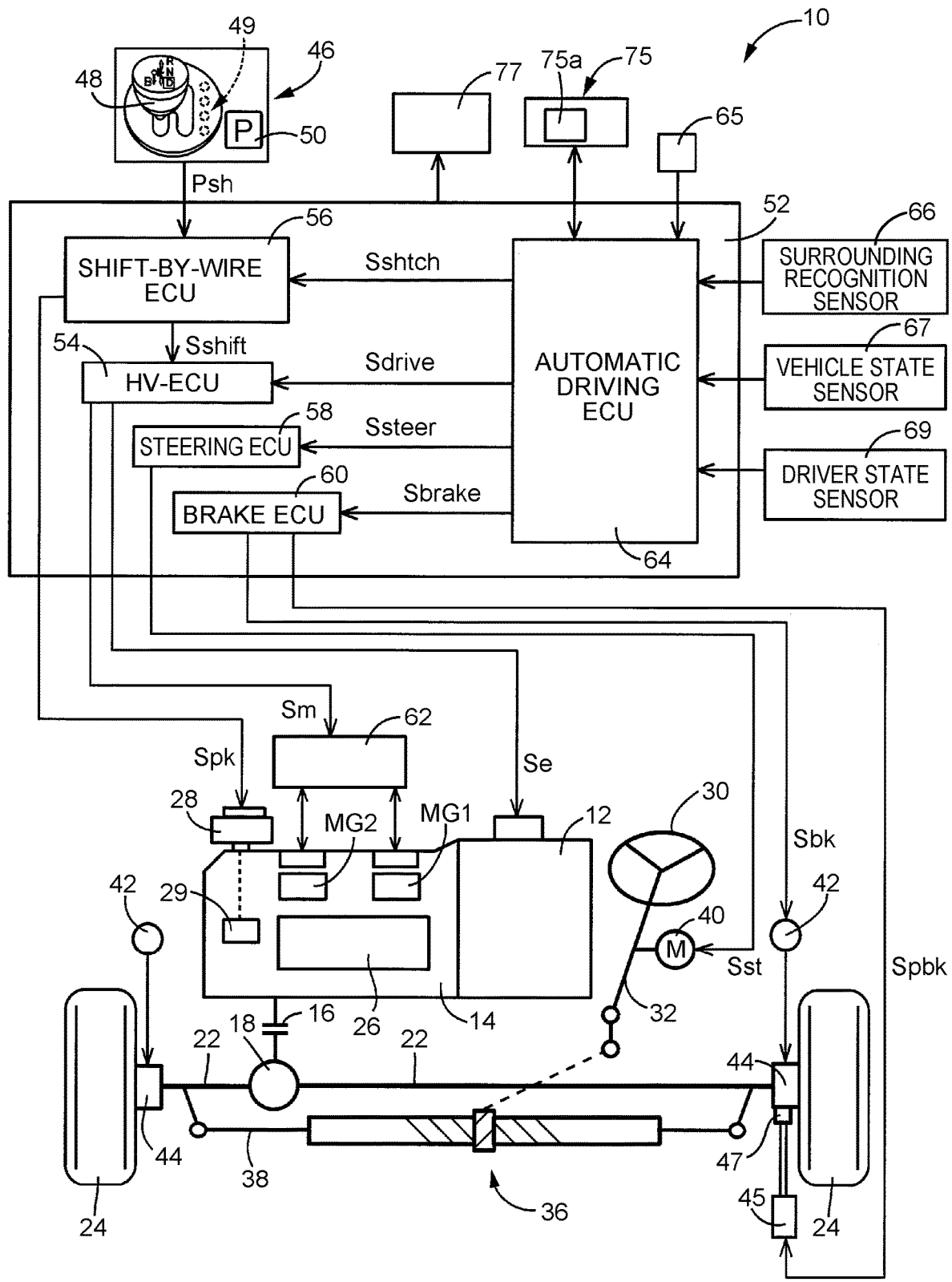
FIG. 1 is a diagram showing a schematic configuration of a hybrid vehicle to which the disclosure is applied and showing a principal part of a control system that is provided for controlling each device of the vehicle.

FIG. 1 shows a schematic configuration of a hybrid vehicle 10 (hereinafter, referred to as a vehicle 10) to which the disclosure is applied and shows a principal part of a control system that is provided for controlling each device of the vehicle 10. The vehicle 10 includes an engine 12 as a drive power source for traveling, a shift transmission device 14, a differential gear apparatus 18 to which dynamic power is transmitted through an output gear 16 of the shift transmission device 14, a pair of right and left axles 22, and right and left front wheels 24.

For example, the shift transmission device 14 is a front-engine front-drive type transaxle that is transversely mounted on the vehicle 10. The shift transmission device 14 includes a first electric motor MG1, a power split mechanism 26 that splits dynamic power transmitted from the engine 12, to the first electric motor MG1 and the output gear 16, and a second electric motor MG2 that is linked with the output gear 16 so as to be capable of transmitting dynamic power. The shift transmission device 14 is driven by an actuator 28, and is provided with a parking lock mechanism 29 that mechanically stops rotation of drive wheels 24.

Each of the first electric motor MG1 and the second electric motor MG2, for example, is a synchronous motor having at least one of a function as a motor that generates mechanical drive power from electric energy and a function as a generator that generates electric energy from mechanical drive power, and preferably should be a motor generator that is selectively actuated as a motor or as a generator. For example, the first electric motor MG1 has a generator (electricity generation) function for producing reaction power of the engine 12 and a motor (electric motor) function for rotating and driving the engine 12 that is in a stop state, and the second electric motor MG2 has an electric motor function that outputs drive power as a drive power source for traveling and an electricity generation function for generating electric energy from drive power on the drive wheel 24 side by regeneration.

In the vehicle 10, dynamic power of the engine 12 is transmitted to the output gear 16 through the power split mechanism 26, and the dynamic power is transmitted to the right and left front wheels 24 through the differential gear apparatus 18 and the pair of axles 22. Further, dynamic power of the second electric motor MG2 is transmitted to the output gear 16, and the dynamic power is transmitted to the right and left front wheels 24 through the differential gear apparatus 18 and the pair of axles 22.

A steering wheel 30 is operated by a driver. When the driver rotates the steering wheel 30, the rotation is transmitted to a gear box 36 through a steering shaft 32 linked with the steering wheel 30. Then, in the gear box 36, the rotation of the steering shaft 32 is converted into lateral motion of a tie rod 38 that is linked with the gear box 36, and the tie rod 38 laterally moves, so that the angles of the right and left front wheels 24 changes. Further, an electric motor 40 to function as an electric power steering system that assists the operation by the driver is provided so as to be capable of transmitting dynamic power to the steering shaft 32. In addition to the assist of the operation by the driver, the electric motor 40, in execution of automatic driving, can change the angles of the right and left front wheels 24 by rotating the steering shaft 32.

Each of the right and left front wheels 24 is provided with a wheel brake 44 to which braking power is given by adjustment of the hydraulic pressure of hydraulic fluid to be supplied to a brake hydraulic cylinder 42. The hydraulic pressure of the hydraulic fluid of the brake hydraulic cylinder 42 increases in proportion to the force on a brake pedal by the driver. The hydraulic pressure of the hydraulic fluid of the brake hydraulic cylinder 42 is controlled also by a brake signal Sbk from a brake ECU 60 described later, and braking power can be given to the front wheel 24 depending on a traveling state of the vehicle 10. In the case of the execution of the automatic driving, the hydraulic pressure of the brake hydraulic cylinder 42 is controlled based on the brake signal Sbk from the brake ECU 60, and an appropriate braking power is given from the wheel brake 44, depending on the traveling state of the vehicle 10. The wheel brake 44 is provided with an electric parking brake 47 that fixes the front wheel such that the front wheel 24 cannot be rotated when a wire is pulled by an electric motor 45.

The shift operation apparatus 46 is provided at a position allowing the driver to operate the shift operation apparatus 46. The shift operation apparatus 46 includes a momentary-type shift lever 48 that is operated to a plurality of shift operation positions Psh, and a P switch 50. In the momentary type, when the shift lever 48 operated by the driver is released, the shift lever 48 returns to a preset home position (M position). Accordingly, each of the shift operation positions Psh is an operation position that is determined based on the operation of the shift lever 48 and the P switch 50 by the driver, and does not always coincide with the position of the shift lever 48.

The shift lever 48 is operated to one of an R position, an N position, a D position, the M position and a B position. The R position, the N position and the D position are three shift operation positions Psh that are arrayed in a front-rear direction of the vehicle 10, that is, in a vehicle longitudinal direction, and the M position and the B position are arrayed parallel to the three shift operation positions Psh. The shift lever 48 can be operated in the vehicle longitudinal direction among the R position, the N position and the D position, and can be operated in the vehicle longitudinal direction between the M position and the B position. The shift lever 48 can be operated in a vehicle transverse direction orthogonal to the vehicle longitudinal direction, between the N position and the M position.

Each shift operation position Psh will be described. When the shift lever 48 is operated to the R position, the shift transmission device 14 is switched to a rearward traveling range (R range) in which the shift transmission device 14 makes the vehicle 10 travel rearward. When the shift lever 48 is operated to the N position, the shift transmission device 14 is switched to a neutral range (N range) in which a power transmission path in the shift transmission device 14 is blocked. When the shift lever 48 is operated to the D position, the shift transmission device 14 is switched to a forward traveling range (D range) in which the shift transmission device 14 makes the vehicle 10 travel forward. When the shift lever 48 is operated to the B position, the shift transmission device 14 is switched to a brake range in which an engine brake is generated.

For example, the P switch 50 is a push-button-type switch. When the P switch 50 is pushed, the parking lock mechanism 29 is actuated through the actuator 28, in the case where a predetermined condition is satisfied, for example, in the case where a vehicle speed V of the vehicle 10 is an extremely-low vehicle speed. At this time, the rotation of the output gear 16 is mechanically prohibited, and thereby, the rotation of the front wheels 24 mechanically linked with the output gear 16 is also prohibited, so that the shift transmission device 14 is switched to a parking range (P range) in which the vehicle 10 is parked.

As shown in FIG. 1, in the vehicle 10, the shift lever 48 of the shift operation apparatus 46 is not mechanically linked with the shift transmission device 14. A shift-by-wire technique in which the shift lever 48 is linked with the shift transmission device 14 through an electric wire is applied to the vehicle 10.

In the interior of the shift operation apparatus 46, four Hall ICs 49 shown by broken lines, which function as a sensor to detect the shift operation positions Psh, are provided. When the shift lever 48 is operated by the driver, respective relative positions between an unillustrated magnet fixed on the shift lever 48 and the Hall ICs 49 change, and thereby, voltage values to be output from the Hall ICs 49 change. The voltage value when the shift lever 48 is operated to the shift operation position Psh is evaluated and stored for each Hall IC 49 in advance. The shift operation position Psh of the shift lever 48 is determined by detection of the voltage value for each Hall IC 49. The voltage value for each shift operation position Psh of the Hall IC 49 is set so as to have a predetermined width, in consideration of part-to-part variation and the like.

Since the four Hall ICs 49 are provided, even in the case where one of the Hall ICs 49 fails, the determination of the shift operation position Psh can be performed based on the other three Hall ICs 49. For example, in the case where one of the Hall ICs 49 fails, the other three Hall ICs 49 output voltage values corresponding to an identical shift operation position Psh, and therefore, the detection of the shift operation position Psh can be performed by the three Hall ICs 49. In this case, although it is determined that one of the Hall ICs 49 has failed, the vehicle 10 can travel based on the shift operation position Psh detected by the three Hall ICs 49.

In the case where two of the Hall ICs 49 fail, the shift operation position Psh is detected based on the other two Hall ICs 49. However, in the case where the reliability of the shift operation position Psh detected by the two Hall ICs 49 is low, it is determined that a detection abnormality by which the shift operation position Psh becomes indefinite has occurred. That is, it is determined that the traveling based on the shift operation position Psh detected by the shift operation apparatus 46 is difficult.

The vehicle 10 includes a plurality of ECUs that functions as an electronic control apparatus 52 of the vehicle 10. The electronic control apparatus 52 controls each device of the vehicle 10, as exemplified by the shift transmission device 14. The electronic control apparatus 52 includes an HV-ECU 54 for a hybrid drive control of the engine 12, the first electric motor MG1 and the second electric motor MG2, a shift-by-wire ECU 56 that controls the traveling range (shift range) of the shift transmission device 14, a steering ECU 58 that controls the electric motor 40 constituting the electric power steering system, a brake ECU 60 that controls the brake hydraulic cylinders 42 for adjusting the braking power of the wheel brakes 44, and an automatic driving ECU 64 for executing an automatic driving control described later. For example, each ECU is configured to include a so-called microcomputer having a CPU, a RAM, a ROM, an input-output interface and the like. The CPU executes various controls for the vehicle 10 by performing signal processing in accordance with programs stored in the ROM in advance, while using the temporary storage function of the RAM.

The HV-ECU 54 has a function to output a required drive power that is required by the driver, and to control the engine 12, the first electric motor MG1 and the second electric motor MG2 depending on the traveling state of the vehicle, such that fuel efficiency is optimized. The HV-ECU 54 outputs, for example, an engine output control command signal Se for output control of the engine 12 and a motor control command signal Sm for drive control of the first electric motor MG1 and the second electric motor MG2, which is a signal to be output to an inverter 62.

The shift-by-wire ECU 56 has a function to detect the shift operation position Psh based on a signal indicating the shift operation position Psh output from the Hall ICs 49 of the shift operation apparatus 46, and to switch the traveling range of the shift transmission device 14 based on the detected shift operation position Psh. For example, when the shift lever 48 is operated to the D position, the shift-by-wire ECU 56 outputs, to the HV-ECU 54, a shift signal Sshift for switching the traveling range to the forward traveling range in which the shift transmission device 14 makes the vehicle 10 travel forward. In response to this signal, the HV-ECU 54 outputs the engine output control command signal Se and the motor control command signal Sm for making the vehicle 10 travel forward. For example, when the P switch 50 is pushed, the shift-by-wire ECU 56 outputs a parking lock command signal Spk for driving the actuator 28, actuating the parking lock mechanism 29 and switching the traveling range of the vehicle 10 to the parking range. Incidentally, when the P switch 50 is pushed, a signal indicating that the P switch 50 has been pushed may be output to the shift-by-wire ECU 56, separately from the signal indicating the shift operation position Psh. The shift-by-wire ECU 56 and the Hall ICs 49 are an example of the operation position detection apparatus that detects the operation position of the shift operation apparatus in the disclosure.

The steering ECU 58 has a function to generate an assist power corresponding to the vehicle speed and an operation angle equivalent to an operation amount of the steering wheel 30 by the driver. When the driver operates the steering wheel 30, the steering ECU 58 outputs, to the electric motor 40, an assist command signal Sst for generating the assist power corresponding to the operation amount of the steering wheel 30.

The brake ECU 60 has a function to generate the braking power corresponding to the traveling state by controlling the hydraulic pressure of the brake hydraulic cylinder 42. For example, when it is determined, from a pressing speed of the brake pedal or the like, that a sudden braking has been performed, the brake ECU 60 outputs a brake control signal Sbk for increasing the hydraulic pressure of the brake hydraulic cylinder 42 to increase the braking power. Further, when the brake ECU 60 receives a command to actuate the electric parking brake 47, the brake ECU 60 outputs, to the electric motor 45, an electric parking brake actuation signal Spbk for actuating the electric parking brake 47.

The automatic driving ECU 64 has a function to perform automatic driving of the vehicle 10 to a set destination based on the destination (destination information), the current position (current position information) and the like, in the case of the switching to the automatic driving. The switching to the automatic driving is performed by pushing an automatic driving switch 65 that is provided at a driver's seat. When the automatic driving switch 65 is pushed again during the automatic driving, or when one of the steering wheel 30, an accelerator pedal and the brake pedal is operated by the driver during the automatic driving, the switching from the automatic driving to manual driving (normal driving) is performed.

From a surrounding recognition sensor 66 (an infrared sensor, a camera and the like), the automatic driving ECU 64 receives a variety of information about the periphery of the vehicle 10, as exemplified by information about an obstacle in the periphery of the vehicle 10 and information of whether there is a vehicle that travels in front or rear of the vehicle 10 or travels on the right or left side of the vehicle 10. Further, from a vehicle state sensor 67, the automatic driving ECU 64 receives a variety of information indicating the vehicle state, as exemplified by an engine speed Ne of the engine 12, a throttle opening degree θth, the traveling range, a speed Nmg1 of the first electric motor MG1, a speed Nmg2 of the second electric motor MG2, the vehicle speed V, and a steering angle θwheel of the steering wheel 30. Further, from a driver state sensor 69, the automatic driving ECU 64 receives information about an actuation state by the driver (a driver state), as exemplified by information of whether the accelerator pedal has been pressed, information of whether the brake pedal has been pressed, and information of whether the steering wheel 30 has been operated. The surrounding recognition sensor 66 is constituted by a plurality of sensors such as the infrared sensor and the camera, and the vehicle state sensor 67 and the driver state sensor 69 are also constituted by a plurality of sensors that detects the vehicle state and a plurality of sensors that detects the driver state, respectively.

The automatic driving ECU 64 outputs a drive power command signal Sdrive that is a signal for adjusting the drive power during the automatic driving and that is output to the HV-ECU 54, a shift switching command signal Ssftch that is a signal for switching the traveling range during the automatic driving and that is output to the shift-by-wire ECU 56, a steering command signal Ssteer that is a signal for adjusting the steering angle θwheel of the steering wheel 30 during the automatic driving and that is output to the steering ECU 58, and a braking power command signal Sbrake that is a signal for adjusting the braking power of the wheel brake 44 during the automatic driving and that is output to the brake ECU 60.

Figure 2:
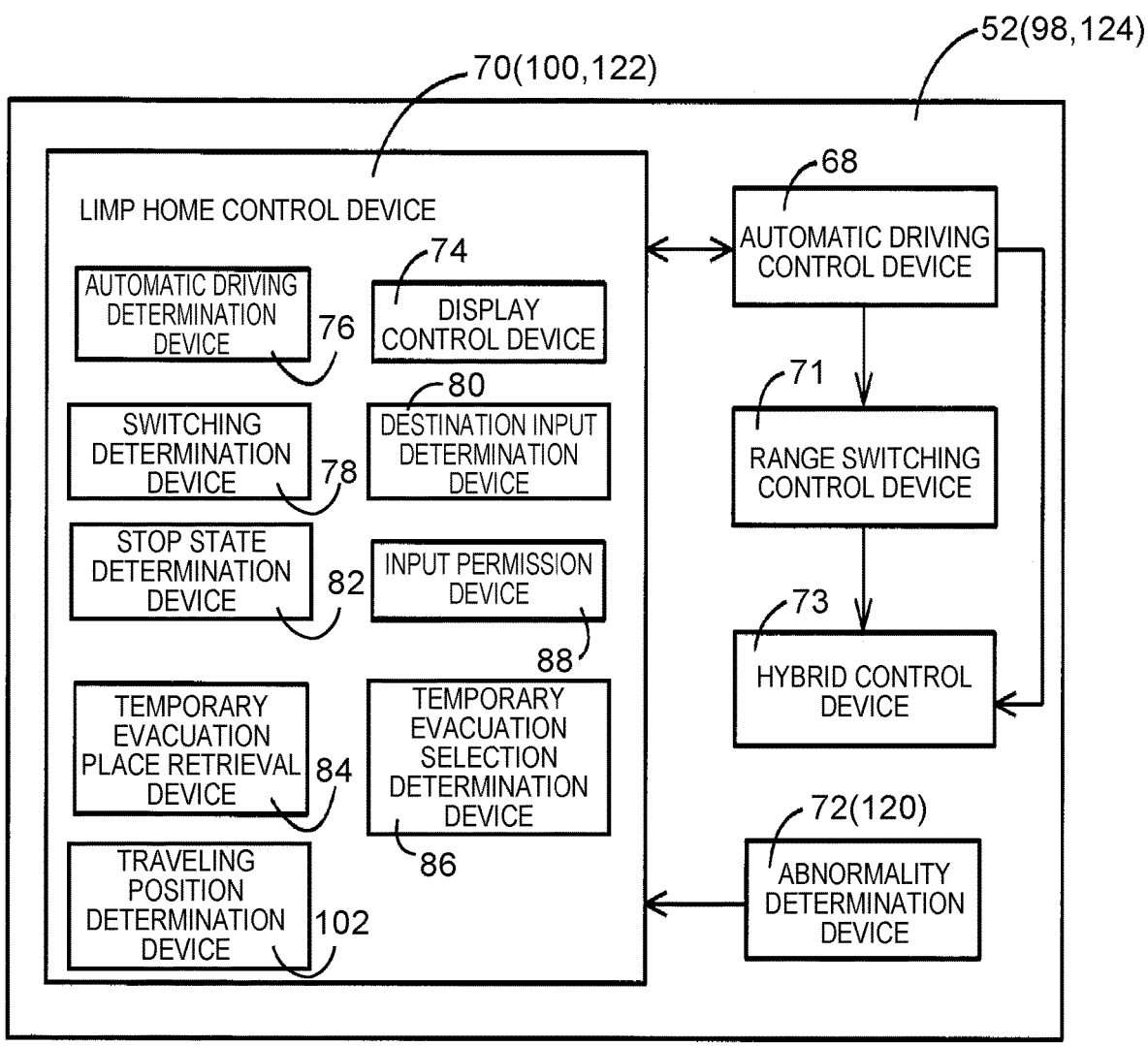
FIG. 2 is a functional block diagram for describing a control function of an electronic control apparatus in FIG. 1.

FIG. 2 is a functional block diagram for describing a principal part of a control function of the electronic control apparatus 52 in FIG. 1. The electronic control apparatus 52 in FIG. 1 is constituted by a plurality of ECUs including the HV-ECU 54, the shift-by-wire ECU 56, the steering ECU 58, the brake ECU 60 and the automatic driving ECU 64. However, in FIG. 2, the electronic control apparatus 52 is illustrated as a single electronic control apparatus 52 having various control functions.

The range switching control device 71 executes a control for switching the traveling range of the shift transmission device 14 based on the shift operation position Psh detected by the shift operation apparatus 46. Preferably, the range switching control device 71 should be functionally included in the shift-by-wire ECU 56. The range switching control device 71 is an example of the control device in the disclosure.

When the shift operation position Psh is switched, the range switching control device 71 outputs a command to output the drive power corresponding to the shift operation position Psh, to a hybrid control device 73. When the P switch 50 is pushed by the driver, the range switching control device 71 outputs a command to switch the shift transmission device 14 to the neutral range, to the hybrid control device 73, and switches the shift transmission device 14 to the P range in which the output gear 16 of the shift transmission device 14 is fixed such that the output gear 16 cannot be rotated, by actuating the parking lock mechanism 29 through the actuator 28.

For example, the hybrid control device 73 controls the traveling of the vehicle 10, by switching traveling mode selectively depending on the traveling state, among a motor traveling mode in which the engine 12 is stopped and only the second electric motor MG2 is used as a drive power source, an engine traveling mode (ordinary traveling mode) in which the vehicle 10 travels while the electricity generation of the first electric motor MG1 is used for the reaction power to the dynamic power of the engine 12 such that engine direct torque is transmitted to the output gear 16 and while the second electric motor MG2 is driven by the generated electric power of the first electric motor MG1 such that torque is transmitted to the output gear 16, and an assist traveling mode (acceleration traveling mode) in which the vehicle 10 travels with a further addition of the drive power of the second electric motor MG2 using electric power from an unillustrated battery in the engine traveling mode. Preferably, the hybrid control device 73 should be functionally included in the HV-ECU 54.

When the automatic driving switch 65 is pushed by the driver so that the automatic driving is selected, an automatic driving control device 68 executes the automatic driving control. The automatic driving control device 68 executes the automatic driving control for making the vehicle 10 travel to a destination by controlling the engine 12 and the first and second electric motors MG1, MG2 and controlling the electric motor 40 and the brake hydraulic cylinder 42 based on the information about the vehicle 10 from the surrounding recognition sensor 66, the information about the vehicle state from the vehicle state sensor 67 and the information about the driver state from the driver state sensor 69. Preferably, the automatic driving control device 68 should be functionally included in the automatic driving ECU 64.

The automatic driving control device 68 automatically sets a target traveling state, based on a variety of setting such as the destination input by the driver, the traveling mode (time preference mode/fuel efficiency preference mode) and the set vehicle speed, map information including vehicle position (GPS), road condition such as a curve, gradient, altitude and legal speed, infrastructure information, a target route and target course, weather, road information including a lane of a traveling road acquired by course recognition, the surrounding recognition sensor 66 and the like, a traffic sign on the traveling road, and a pedestrian on the traveling road. For example, the map information, the infrastructure information and the road information are based on information stored in a navigation apparatus 75 that functions as a pathway guidance apparatus and information acquired by communication with the exterior of the vehicle 10.

The automatic driving control device 68 performs the automatic driving control by automatically performing the acceleration, the deceleration, the braking and the steering based on the target traveling state. For example, the automatic driving control device 68 calculates a F/F drive power in a feedforward control (F/F control) based on the target traveling state and a F/B drive power in a feedback control (F/B control) based on a vehicle speed difference between a target vehicle speed and the actual vehicle speed V. Next, the automatic driving control device 68 computes a required drive power or required braking power based on a total drive power of the F/F drive power and the F/B drive power and a traveling resistance amount.

The automatic driving control device 68 outputs, to the HV-ECU 54, a command to control the engine 12 and the electric motors MG1, MG2 such that the required drive power (or drive torque) or the required braking power (or braking torque) is obtained. The automatic driving control device 68 computes a required braking power of a foot brake in a usable range, and outputs, to the brake hydraulic cylinder 42, a brake signal Sbk for controlling the braking torque such that the required braking power is obtained. As a result, the engine 12, the electric motors MG1, MG2 and the gear ratio of the shift transmission device 14 are controlled, so that a desired drive power and a desired braking power are obtained. Further, the automatic driving control device 68 computes a required steering angle based on the target traveling state, the lane of the traveling road, the pedestrian on the traveling road, the vehicle on the traveling road, and the like, and outputs a command to control the rotation angle of the electric motor 40 such that the required steering angle is obtained.

When the automatic driving control device 68 determines a switching operation to the automatic driving by the push of the automatic driving switch 65 by the driver, the automatic driving control device 68 determines whether the destination for the automatic driving has been input in advance. The destination corresponds to the destination stored in the navigation apparatus 75 (pathway guidance apparatus) in advance. In the case where the destination has been input to the navigation apparatus 75, the automatic driving control device 68 automatically creates a traveling pathway to the destination based on traveling pathways input to the navigation apparatus 75, and makes the vehicle 10 automatically travel along the created pathway.

In the case where the destination has not been input, the automatic driving control device 68 notifies the driver of the switching to the manual driving (normal driving) through the display on an instrument panel 77 provided at the driver's seat, and thereafter, performs the switching to the manual driving.

When the operation by the driver is detected during the automatic driving, the automatic driving control device 68 performs the switching to the manual driving. Specifically, when one of the press operation of the accelerator pedal, the press operation of the brake pedal and the operation of the steering wheel 30 is detected during the automatic driving, the automatic driving control device 68 gives priority to the operation by the driver and performs the switching to the manual driving.

When the vehicle 10 arrives at the destination, the automatic driving control device 68 executes automatic parking in the case where a parking lot is provided. The automatic driving control device 68 retrieves parking lots of the parking area into which the vehicle 10 can be parked, and displays a screen for selection from the retrieved parking lots, on a monitor 75a of the navigation apparatus 75, such that the driver selects a parking lot into which the driver wants to park the vehicle 10. When the driver selects the parking lot, the automatic driving control device 68 moves the vehicle 10 to the selected parking lot, and executes an automatic parking control for parking the vehicle 10 into the parking lot. For example, the automatic driving control device 68 appropriately adjusts the vehicle speed V and the steering angle θwheel such that the vehicle 10 moves along a white line drawn on the parking lot.

Figure 3:
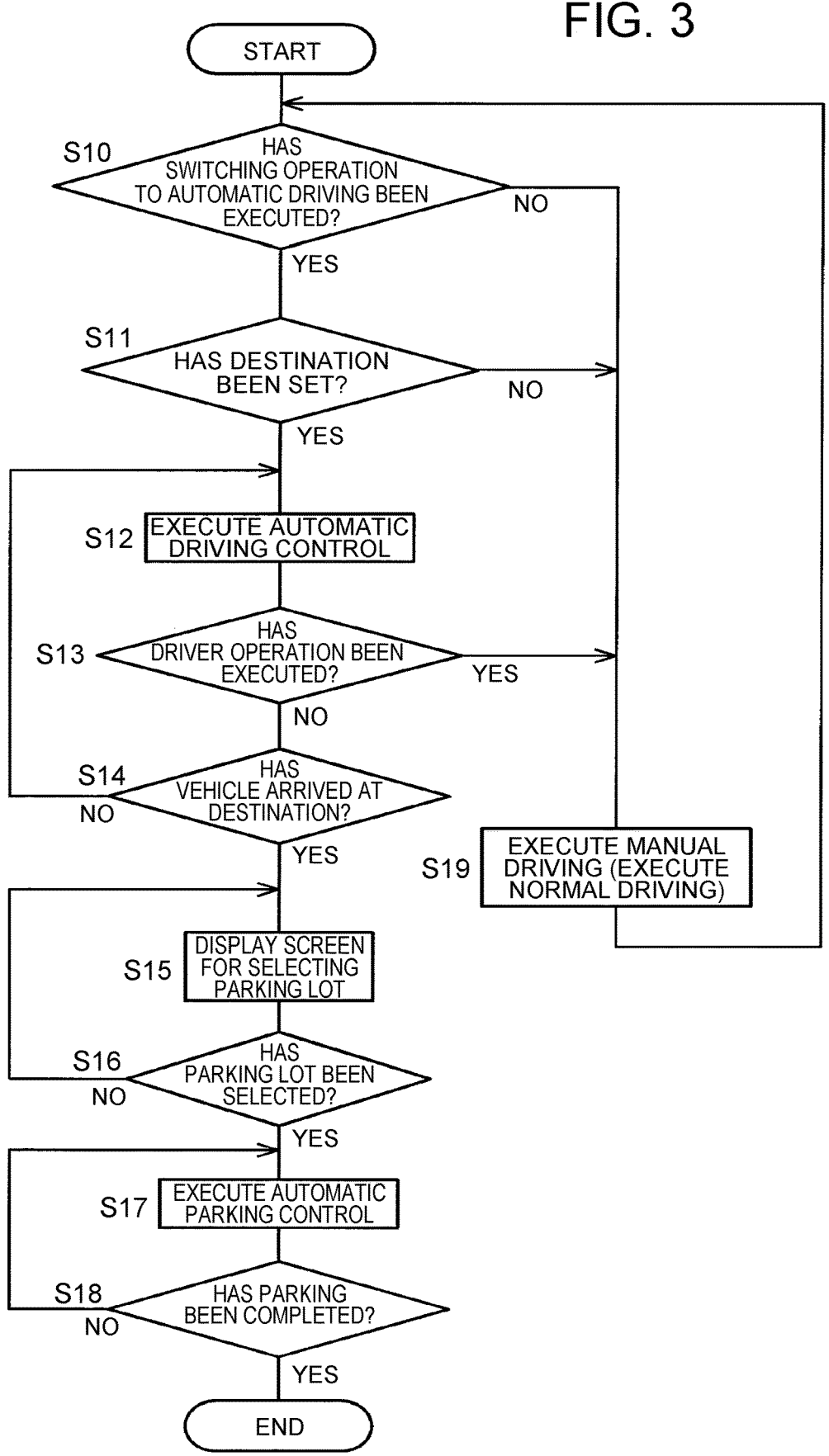
FIG. 3 is a flowchart for describing a principal part of a control operation of an automatic driving ECU in FIG. 2, that is, a control operation about automatic driving.

FIG. 3 is a flowchart for describing a control operation of the electronic control apparatus 52 (automatic driving ECU 64), which is a control operation about the automatic driving. The flowchart is repeatedly executed during vehicle traveling.

First, the automatic driving control device 68 determines whether the switching operation to the automatic driving by the driver has been executed by the push of the automatic driving switch 65 by the driver, in step S10 (hereinafter, "step" is omitted) corresponding to a control function of the automatic driving control device 68. In the case where the automatic driving switch 65 has not been pushed, the negative determination is made in S10, and the manual driving (normal driving) is executed in S19. In the case where the automatic driving switch 65 has been pushed, the positive determination is made in S10, and the automatic driving control device 68 determines whether the destination has been input, in S11 corresponding to the control function of the automatic driving control device 68. In the case where the destination has not been input, the negative determination is made in S11, and the manual driving is executed in S19. In the case where the destination has been input, the positive determination is made in S11, and the automatic driving control device 68 executes the automatic driving control for making the vehicle 10 travel to the destination, in S12 corresponding to the control function of the automatic driving control device 68.

The automatic driving control device 68 determines whether the operation by the driver (driver operation) has been executed during the automatic driving control, in S13 corresponding to the control function of the automatic driving control device 68. In the case where the operation by the driver has been executed, the positive determination is made in S13, and the switching to the manual driving is executed in S19. In the case where the operation by the driver has not been detected, the negative determination is made in S13, and the automatic driving control device 68 determines whether the vehicle 10 has arrived at the destination, in S14 corresponding to the control function of the automatic driving control device 68. In the case where the vehicle 10 has not arrived at the destination, the negative determination is made in S14. The routine returns to S12, and the automatic driving control is continuously executed.

In the case where the vehicle 10 has arrived at the destination, the positive determination is made in S14, and the automatic driving control device 68 displays the screen for selecting the parking lot, on the monitor 75a of the navigation apparatus 75, in S15 corresponding to the control function of the automatic driving control device 68. The automatic driving control device 68 determines whether the parking lot has been selected by the driver, in S16 corresponding to the control function of the automatic driving control device 68. In the case where the parking lot has not been selected, the negative determination is made in S16. The routine returns to S15, and waits while the screen for selecting the parking lot is kept, until the parking lot is selected.

In the case where the parking lot has been selected, the positive determination is made in S16, and the automatic driving control device 68 executes the automatic driving control for the vehicle 10, in S17 corresponding to the control function of the automatic driving control device 68. Next, the automatic driving control device 68 determines whether the parking has been completed, in S18 corresponding to the control function of the automatic driving control device 68. In the case where the parking has not been completed, the negative determination is made in SI 8. The routine returns to S17, and the automatic parking control is continuously executed. In the case where the parking has been completed, the positive determination is made in S18, and the routine ends. Although not shown in the flowchart of FIG. 3, in the case where the destination has not been input at the time of the switching to the automatic driving, a follow-up traveling in which the vehicle 10 travels while following a vehicle that is traveling in front of the vehicle 10 may be executed.

Meanwhile, in the case where a detection abnormality by which the shift operation position Psh of the shift operation apparatus 46 becomes indefinite occurs during traveling, in the related art, the current traveling range is kept until the operation of the shift lever 48 is detected, and the traveling range is switched to the N range when the operation of the shift lever 48 is detected. Accordingly, in the case where the shift lever 48 is operated and the traveling range is switched to the N range before the vehicle 10 arrives at an appropriate evacuation place, the vehicle 10 cannot travel in a limp home mode. The detection abnormality by which the shift operation position Psh becomes indefinite in the embodiment is an example of the detection abnormality of the operation position detection apparatus in the disclosure.

For solving this problem, the electronic control apparatus 52 functionally includes an abnormality determination device 72 that determines whether the detection abnormality by which the shift operation position Psh becomes indefinite has occurred, and a limp home control device 70 that makes the vehicle 10 travel based on the destination information and the current position information in the case where the abnormality determination device 72 determines that the detection abnormality by which the shift operation position Psh becomes indefinite has occurred during traveling. The destination information may include information about the set destination and information that no destination is set.

The limp home control device 70 functionally includes a display control device 74, an automatic driving determination device 76, a switching determination device 78, a destination input determination device 80, a stop state determination device 82, a temporary evacuation place retrieval device 84, a temporary evacuation selection determination device 86, and an input permission device 88.

The abnormality determination device 72 determines whether the detection abnormality by which the shift operation position Psh becomes indefinite has occurred. The abnormality determination device 72 determines whether an abnormality has occurred in the Hall ICs 49 for detecting the shift operation position Psh of the shift operation apparatus 46. For example, in the case where three Hall ICs 49 of the four Hall ICs 49 output voltage values corresponding to an identical shift operation position Psh but the remaining one Hall IC 49 outputs a voltage value corresponding to a different shift operation position Psh from the shift operation position Psh for the other three Hall ICs 49, or in the case where one Hall IC 49 does not output the voltage value, the abnormality determination device 72 determines that the one Hall IC 49 has failed. At this time, the display control device 74 displays a notice that the abnormality has occurred in the one Hall IC 49, on the instrument panel 77 at the driver's seat.

Since the three Hall ICs 49 output the voltage values corresponding to the identical shift operation position Psh, in that case, it is determined that the shift operation to the shift operation position Psh based on the voltage values of the three Hall ICs 49 has been performed. That is, in the case where the abnormality has occurred in the one Hall IC 49, the abnormality determination device 72 determines that the abnormality has occurred in the one Hall IC 49, but the shift operation position Psh is determined based on the voltage values of the three Hall ICs 49. That is, the manual driving is continuously executed based on the shift operation position Psh that is detected by the three Hall ICs 49.

In the case where two Hall ICs 49 of the four Hall ICs 49 output voltage values corresponding to an identical shift operation position Psh but the other two Hall ICs 49 output voltage values corresponding to different shift operation positions Psh from each other, the abnormality determination device 72 determines that the abnormality has occurred in the two Hall ICs 49. Further, in the case where the two Hall ICs 49 output voltage values corresponding to an identical shift operation position Psh, there is a possibility that the shift operation to the identical shift operation position Psh has not been performed. Therefore, in that case, the abnormality determination device 72 determines that the detection abnormality by which the shift operation position Psh after the shift operation becomes indefinite has occurred.

In the case where the abnormality determination device 72 determines that the detection abnormality by which the shift operation position Psh of the shift operation apparatus 46 becomes indefinite has occurred during traveling, the limp home control device 70 executes a control for making the vehicle 10 travel without depending on the operation of the shift operation apparatus 46 by the driver. A control manner of the limp home control device 70 in the case where the detection abnormality by which the shift operation position Psh becomes indefinite has occurred will be described below.

In the case where the abnormality determination device 72 determines that the shift operation position Psh becomes indefinite, for example, due to the occurrence of the abnormality of two Hall ICs 49, the display control device 74, for the driver, displays a notice that a limp home control is able to be executed, on the instrument panel 77 at the driver's seat. The notice can be given not only by the display on the screen but also by a voice. The display control device 74 corresponds to the notification device in the disclosure.

In the case where the abnormality determination device 72 determines the occurrence of the detection abnormality that the shift operation position Psh becomes indefinite, the automatic driving determination device 76 determines whether the automatic driving of the vehicle 10 is being executed by the automatic driving control device 68. In the case where the automatic driving is being executed, the limp home control device 70 outputs a command to continue the automatic driving, to the automatic driving control device 68. That is, in the case where the automatic driving is being executed, the limp home control device 70 continues the automatic driving as limp home traveling. Therewith, the display control device 74 displays a notice that the detection abnormality by which the shift operation position Psh becomes indefinite and the switching to the manual traveling is impossible, on the instrument panel 77 at the driver's seat.

On the other hand, in the case where the manual driving is being executed by the automatic driving determination device 76, the display control device 74 displays an automatic driving guidance display for a notice that the automatic driving is needed for continuing the traveling, on the instrument panel 77 at the driver's seat.

In the case where the abnormality determination device 72 determines that the shift operation position Psh is indefinite, the switching determination device 78 determines whether the switching from the manual driving to the automatic driving has been performed by the driver. In the case where the automatic driving switch 65 is pushed after the automatic driving guidance display is displayed on the instrument panel 77, the switching determination device 78 determines that the switching to the automatic driving has been performed. In the case where the switching to the automatic driving has been performed by the driver, the limp home control device 70 outputs, to the automatic driving control device 68, a command to make the vehicle 10 travel under the automatic driving control, that is, to execute the automatic driving of the vehicle 10 based on the destination and the current position information. An automatic driving control in the case where the shift operation position Psh is indefinite will be described later.

In the case where the switching to the automatic driving has not been performed by the driver, the limp home control device 70 determines whether the current traveling range is the D range, which is the forward traveling range. In the case where the limp home control device 70 determines that the traveling range is the D range, the limp home control device 70 determines whether the vehicle speed V is equal to or higher than a predetermined vehicle speed V1. The predetermined vehicle speed V1 is a value that is evaluated based on experiments or design in advance, and is set to a low value allowing a determination that the driver intends to stop the vehicle 10. In the case where the vehicle speed V of the vehicle 10 is equal to or higher than the predetermined vehicle speed V1, the limp home control device 70 makes the vehicle 10 continuously travel while keeping the D range.

On the other hand, in the case where the vehicle speed V is lower than the predetermined vehicle speed V1, the limp home control device 70 switches the traveling range to the N range, and stops the vehicle 10. When the vehicle 10 stops, the limp home control device 70 permits the driver to operate the navigation apparatus 75 (to input the destination), and determines whether the navigation apparatus 75 has been operated. In the case where the navigation apparatus 75 has been operated, the limp home control device 70 determines again whether the switching operation to the automatic driving has been performed by the driver. In the case where the switching to the automatic driving has been performed, the limp home control device 70 makes the vehicle 10 to the destination input to the navigation apparatus 75. On the other hand, in the case where the navigation apparatus 75 has not operated, the limp home control device 70 determines whether a vehicle electric power source has been turned off (IG-OFF), and in the case where the vehicle electric power source has been turned off, the vehicle 10 is parked.

Next, a control when the switching to the automatic driving has been switched in the case where the abnormality determination device 72 determines the occurrence of the detection abnormality that the shift operation position Psh becomes indefinite will be described.

When the switching to the automatic driving has been performed, the destination input determination device 80 determines whether the destination has been input in advance to the navigation apparatus 75 that sets a traveling pathway to the destination. In the case where the destination has been input in advance to the navigation apparatus 75, the limp home control device 70 outputs, to the automatic driving control device 68, a command to execute an automatic driving control for making the vehicle 10 travel to the destination input to the navigation apparatus 75 and an automatic parking control for making the vehicle 10 park. Thereby, since the automatic driving of the vehicle 10 to the destination is performed as the limp home traveling, the vehicle 10 transitions to the limp home mode quickly without stopping. Specific control manners of the automatic driving control and automatic parking control in the case where the destination has been input are basically the same as the above-described controls, and therefore, descriptions for the control manners are omitted.

On the other hand, in the case where the destination has not been input to the navigation apparatus 75, the stop state determination device 82 determines whether the vehicle 10 is in the stop state. In the case where the stop state determination device 82 determines that the vehicle 10 is in the stop state, the input permission device 88 permits the driver to operate the navigation apparatus 75, specifically, to input the destination in the limp home control. When the driver operates the navigation apparatus 75 so that the destination is input by the driver, the limp home control device 70 outputs, to the automatic driving control device 68, a command to execute the automatic driving control in which the destination is the destination input to the navigation apparatus 75 and to execute the automatic parking control. Thereby, as the limp home traveling of the vehicle 10, the automatic traveling and automatic parking of the vehicle 10 are executed based on the input destination and the current position.

In the case where the stop state determination device 82 determines that the vehicle 10 is traveling, the limp home control device 70 temporarily stops the vehicle 10 on a road shoulder or the like. After the vehicle 10 stops, the temporary evacuation place retrieval device 84 retrieves a temporary evacuation place appropriate for a temporary evacuation, based on the current position information. The retrieval of the temporary evacuation place may be executed while the vehicle 10 is traveling.

The temporary evacuation place is set to a safe place where a rear-end collision of a following vehicle or the like is avoided during the stop of the vehicle 10. After the temporary evacuation place is retrieved, the display control device 74 switches the monitor 75a of the navigation apparatus 75, to a screen for selecting the retrieved temporary evacuation place. In the case where only one temporary evacuation place is retrieved, the display control device 74 displays the retrieved temporary evacuation place such that the driver can perform the selection, and in the case where a plurality of temporary evacuation places is retrieved, the display control device 74 displays some of the temporary evacuation places such that the driver can perform the selection. The temporary evacuation place is included in the destination information in the disclosure.

The temporary evacuation selection determination device 86 determines whether the temporary evacuation place has been selected by the driver. For example, when the temporary evacuation place displayed on the monitor 75a of the navigation apparatus 75 has been selected by the driver, the temporary evacuation selection determination device 86 determines that the temporary evacuation place has been selected. After the temporary evacuation place has been selected, the limp home control device 70 outputs a command to make the vehicle 10 travel to the selected temporary evacuation place, to the automatic driving control device 68. Thereby, the automatic driving of the vehicle 10 to the temporary evacuation place is performed, and the automatic parking is performed. Specific control manners of the automatic driving control of the vehicle 10 to the temporary evacuation place and the automatic parking control are basically the same as the above-described controls in the case where the destination has been input, and therefore, descriptions for the control manners are omitted.

By temporarily stopping the vehicle 10 at the time of the selection of the temporary evacuation place in this way, the driver can safely select the temporary evacuation place, and can select a temporary evacuation place that is convenient for the driver. Further, since the vehicle 10 travels to the temporary evacuation place by the selection of the temporary evacuation place, the driver, thereafter, can operate the navigation apparatus 75 and input the destination at a safe place.

In the above example, the temporary evacuation place is selected while the vehicle 10 is temporarily in the stop state on a road shoulder or the like, and then, the vehicle 10 automatically drives to the temporary evacuation place. However, the temporary evacuation place may be retrieved during traveling, and the vehicle 10 may automatically travel to an automatically retrieved predetermined temporary evacuation place. Specifically, in the case where the abnormality determination device 72 determines that the detection abnormality has occurred during traveling, the limp home control device 70 sets an appropriate temporary evacuation place based on the current position information, and executes the automatic driving control to the set temporary evacuation place. By automatically performing the switching to the automatically driving control during traveling in this way, the vehicle 10 can travel to the temporary evacuation place without stopping temporarily. Further, by continuing the traveling in accordance with a traveling stream in the periphery, it is possible to reduce a risk of collision of a following vehicle.

When the vehicle 10 arrives at the temporary evacuation place, the vehicle 10 stops. The input permission device 88 permits the driver to operate the navigation apparatus 75, and thereby, the driver can input the destination using the navigation apparatus 75. In addition to the destination directly input by the driver, for example, at least one of an automobile retailer (dealer) and a repair shop can be selected as a candidate of the destination.

The reason why the automobile retailer and the repair shop are set as the candidate of the destination is that it is necessary to lead the driver to quickly repair the vehicle 10 because the shift operation position Psh is indefinite and therefore the manual driving is impossible. Further, it is not necessary for the driver to retrieve the automobile retailer and the repair shop for repairing the vehicle 10.

When the destination has been input by the driver, the limp home control device 70 outputs a command to execute the automatic driving of the vehicle 10 to the input destination and the automatic parking, to the automatic driving control device 68. In response to this command, the automatic driving control device 68 executes the automatic driving of the vehicle 10 to the destination, and executes the automatic parking of the vehicle 10 into a predetermined parking lot.

After the vehicle 10 arrives at the destination and then the parking of the vehicle 10 is completed, the display control device 74 displays a warning indicating that the manual driving is impossible and the repair of the vehicle 10 is necessary, on the instrument panel 77. Thereby, the driver can know the state of the vehicle 10, and can perform an appropriate response such as a setting of the dealer or repair shop as the next destination.

Figure 4:
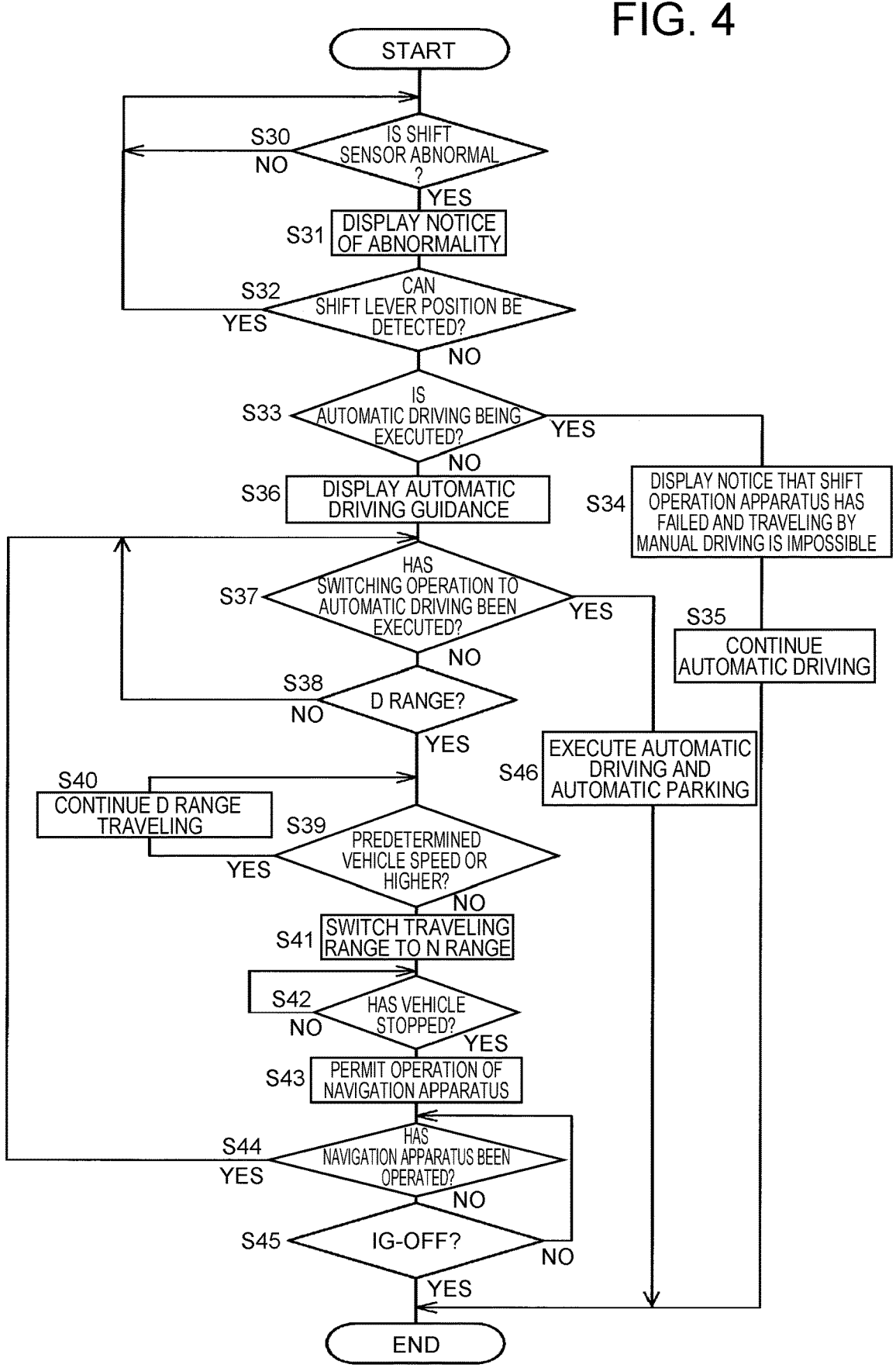
FIG. 4 is a flowchart for describing a control operation of the electronic control apparatus in FIG. 2 in the case where the detection abnormality of a shift operation position occurs during traveling.

FIG. 4 is a flowchart for describing a control operation of the electronic control apparatus 52 in the case where the detection abnormality of the shift operation position Psh has occurred during traveling. The flowchart is repeatedly executed during vehicle traveling.

First, the abnormality determination device 72 determines whether the abnormality has occurred in the Hall ICs 49 that function as a shift sensor of the shift operation apparatus 46, in step S30 corresponding to the control function of the abnormality determination device 72. In the case where the abnormality determination device 72 determines that all Hall ICs 49 are normal, the negative determination is made in S30. The routine returns to S30, and the same determination is repeatedly executed.

In the case where the positive determination is made in S30, the display control device 74 displays a notice of the occurrence of the abnormality of the Hall ICs 49, on the instrument panel 77 at the driver's seat, in S31 corresponding to the control function of the display control device 74. The abnormality determination device 72 determines whether the shift operation position Psh of the shift lever 48 can be detected, in S32 corresponding to the control function of the abnormality determination device 72. In the case where the shift operation position Psh of the shift lever 48 can be detected, the positive determination is made in S32, and the routine returns to S30. The case where the abnormality of the Hall ICs 49 is determined in S30 and where the shift operation position Psh can be detected in S32 corresponds to a case where the abnormality has been detected in one of the Hall ICs 49.

In the case where the shift operation position Psh of the shift lever 48 cannot be detected, the negative determination is made in S32, and the automatic driving determination device 76 determines whether the automatic driving is being executed, in S33 corresponding to the control function of the automatic driving determination device 76. In the case where the automatic driving is being executed, the positive determination is made in S33, and the display control device 74 displays a notice that the shift operation apparatus 46 has failed and the traveling by the manual driving is impossible, on the instrument panel 77 at the driver's seat, in S34 corresponding to the control function of the display control device 74. Further, the automatic driving control device 68 continuously executes the automatic driving control, in S35 corresponding to the control function of the automatic driving control device 68.

Back to S33, in the case where the automatic driving determination device 76 determines that the manual driving is being executed, the negative determination is made in S33, and the display control device 74 displays a notice (automatic driving guidance display) that the switching from the manual driving to the automatic driving is needed, on the instrument panel 77, in S36 corresponding to the control function of the display control device 74. The switching determination device 78 determines whether the switching operation to the automatic driving has been executed by the driver, in S37 corresponding to the control function of the switching determination device 78.

In the case where the switching operation to the automatic driving has not been executed, the negative determination is made in S37. The limp home control device 70 determines whether the current traveling range is the D range, in S38 corresponding to the control function of the limp home control device 70. In the case where the traveling range is other than the D range, the negative determination is made in S38. The routine returns to S37, and the switching determination device 78 determines whether the switching operation to the automatic driving has been executed. In the case where the traveling range is the D range, the positive determination is made in S38, and the limp home control device 70 determines whether the vehicle speed V is equal to or higher than the predetermined vehicle speed V1, in S39 corresponding to the control function of the limp home control device 70. In the case where the vehicle speed V is equal to or higher than the predetermined vehicle speed V1, the positive determination is made in S39, the limp home control device 70 continuously executes the traveling in the D range, in S40 corresponding to the control function of the limp home control device 70.

In the case where the vehicle speed V is lower than the predetermined vehicle speed V1, the negative determination is made in S39, and the limp home control device 70 switches the traveling range to the N range, in S41 corresponding to the control function of the limp home control device 70. The limp home control device 70 determines whether the vehicle 10 has stopped, in S42 corresponding to the control function of the limp home control device 70. In the case where the vehicle 10 has not stopped, the negative determination is made in S42, and the determination in S42 is repeatedly executed until the vehicle 10 stops. In the case where the vehicle 10 has stopped, the positive determination is made in S42, and the limp home control device 70 permits the operation of the navigation apparatus 75 in S43. The limp home control device 70 determines whether the navigation apparatus 75 has been operated by the driver, specifically, whether the destination has been input, in S44 corresponding to the control function of the limp home control device 70. In the case where the navigation apparatus 75 has been operated, the positive determination is made in S44. The routine returns to S37, and the switching determination device 78 determines again whether the switching operation to the automatic driving has been executed. In the case where the navigation apparatus 75 has not been operated, the negative determination is made in S44, and the limp home control device 70 determines whether the vehicle electric power source has been turned off (IG-OFF), in S45 corresponding to the control function of the limp home control device 70. In the case where the vehicle electric power source has not been turned off, the negative determination is made in S45. The routine returns to S44, and the limp home control device 70 determines whether the navigation apparatus 75 has been operated. In the case where the vehicle electric power source has been turned off, the positive determination is made in S45, and the routine ends.

Back to S37, in the case where the switching operation to the automatic driving has been executed, the positive determination is made in S37, and the routine proceeds to S46. The control operation in S46 will be described using a flowchart in FIG. 5.

First, the destination input determination device 80 determines whether the destination has been input to the navigation apparatus 75, in S50 corresponding to the control function of the destination input determination device 80. In the case where the destination has been input, the positive determination is made in S50. The routine proceeds to S51, and control operations in S51 and later (S51 to S55) are executed. The control operations in S51 to S55 are basically the same as the above-described automatic driving control and automatic parking control shown in S12 to S18 (except for S13) of FIG. 3, and therefore, descriptions for the control operations are omitted.

In the case where the destination has not been input in S50, the negative determination is made in S50, and the routine proceeds to S56. The stop state determination device 82 determines whether the vehicle 10 is in the stop state, in S56 corresponding to the control function of the stop state determination device 82. In the case where the vehicle 10 is in the stop state, the positive determination is made in S56. The input permission device 88 permits the operation of the navigation apparatus 75, in 561 corresponding to the control function of the input permission device 88, and the routine returns to S50. In the case where the navigation apparatus 75 has been operated and the destination has been input, the positive determination is made in S50, and S51 to S55 are executed, so that the automatic driving to the destination is executed.

On the other hand, in the case where the vehicle is traveling in S56, the negative determination is made in S56, and the limp home control device 70 temporarily stops the vehicle 10, in S57 corresponding to the control function of the limp home control device 70. The temporary evacuation place retrieval device 84 retrieves the candidate of the temporary evacuation place, in S58 corresponding to the control function of the temporary evacuation place retrieval device 84, and the display control device 74 displays the screen for selecting the retrieved temporary evacuation place, on the monitor 75*a* of the navigation apparatus 75, in S59 corresponding to the control function of the display control device 74. The temporary evacuation selection determination device 86 determines whether the temporary evacuation place has been selected by the driver, in S60 corresponding to the control function of the temporary evacuation selection determination device 86. In the case where the temporary evacuation place has been selected by the driver, the positive determination is made in S60. The selected temporary evacuation place is set as the destination, and the control operations in S51 to S55 are executed, so that the automatic driving of the vehicle 10 to the temporary evacuation place is executed. In the case where the temporary evacuation place has not been selected, the negative determination is made in S60. The routine returns to S59, and the display control device 74 continuously displays the screen for selecting the temporary evacuation place, such that the driver selects the temporary evacuation place. When the vehicle 10 arrives at the temporary evacuation place, the destination is input by the driver, and the automatic driving to the input destination is executed. That is, S50 to S55 in the flowchart of FIG. 5 are executed again.

Figure 5:
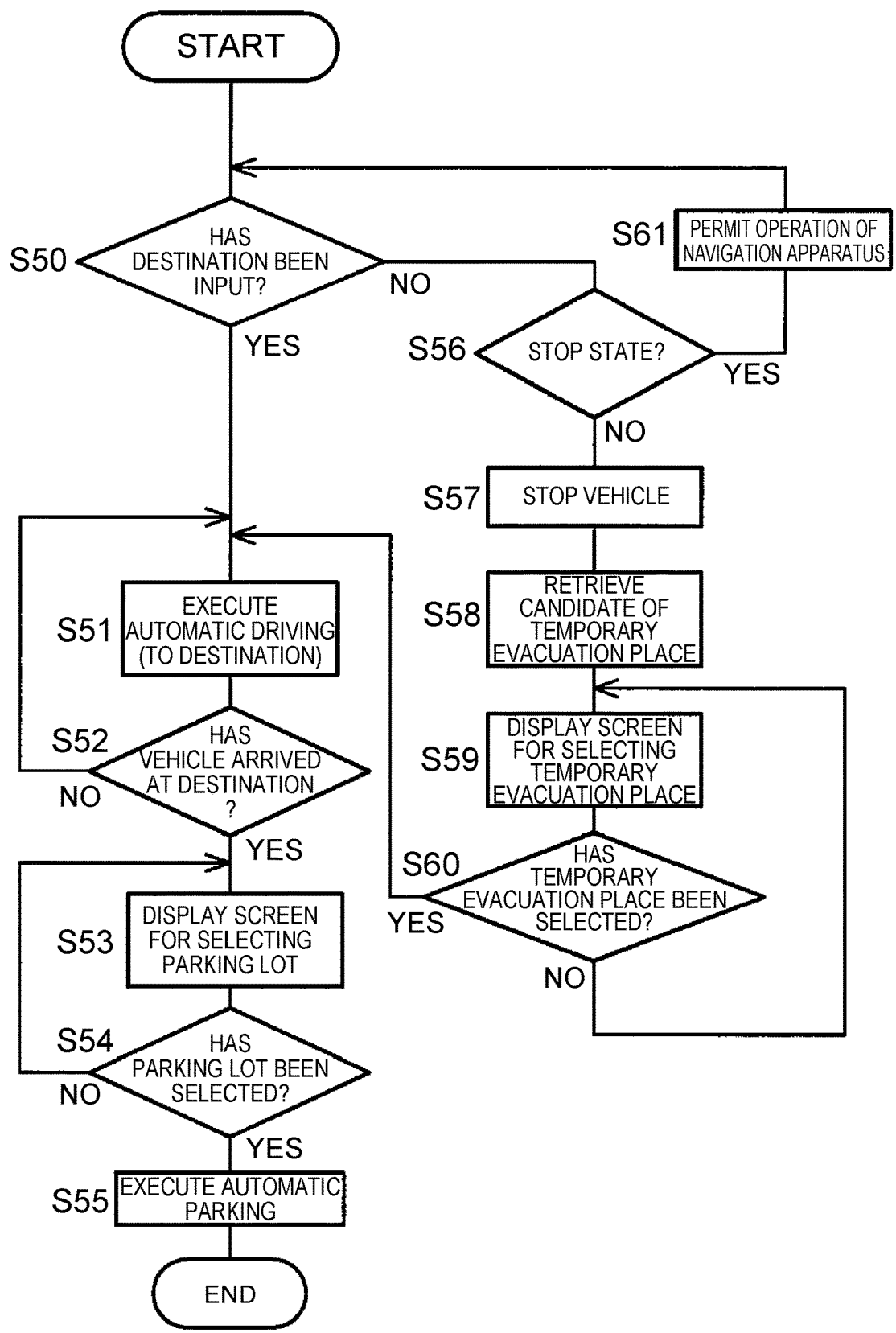
FIG. 5 is a flowchart for describing a limp home control in the case of the occurrence of the detection abnormality of the shift operation position.

In the flowchart of FIG. 5, in the case where the destination has not been input, the vehicle 10 temporarily stops on a road shoulder or the like, even during traveling. Thereafter, the temporary evacuation place is retrieved, and the temporary evacuation place is selected by the driver. However, the temporary evacuation place appropriate for stop may be retrieved during traveling, and the switching to the automatic driving in which the vehicle 10 travels to the automatically retrieved temporary evacuation place may be automatically executed. Thereby, the vehicle 10 can travel to the temporary evacuation place without stopping. Further, the selection of the temporary evacuation place may be permitted during traveling, because the driver does not need to watch the monitor 75*a* for a long time. In the case where the driver does not select the temporary evacuation place and where a vehicle is traveling in front of the vehicle 10, the follow-up traveling in which the vehicle 10 follows the vehicle traveling in front of the vehicle 10 may be executed as the limp home traveling.

As described above, with the embodiment, even in the case of the occurrence of the detection abnormality by which the shift operation position Psh of the shift operation apparatus 46 becomes indefinite, the vehicle 10 travels based on the destination information and the current position information, and therefore, can continue the limp home traveling.

With the embodiment, in the case where the abnormality determination device 72 determines the occurrence of the detection abnormality that the shift operation position Psh of the shift operation apparatus 46 becomes indefinite, the driver is notified that the limp home control is able to be executed, through the display on the instrument panel 77. Therefore, even in the case of the occurrence of the detection abnormality, the driver can recognize that the limp home control is able to be executed.

With the embodiment, in the case where the abnormality determination device 72 determines the occurrence of the detection abnormality that the shift operation position Psh of the shift operation apparatus 46 becomes indefinite and where the automatic driving is being executed, the automatic driving is continuously executed. Therefore, it is possible to continue the traveling of the vehicle 10 by the automatic driving.

With the embodiment, in the case where the abnormality determination device 72 determines the occurrence of the detection abnormality that the shift operation position Psh of the shift operation apparatus 46 becomes indefinite and where the stop state determination device 82 determines that the vehicle 10 is in the stop state, the input of the destination is permitted, and therefore, the input of the destination is performed during vehicle stop, so that the input of the destination can be performed in a safe state.

With the embodiment, when the switching to the automatic driving is performed by the driver, the automatic driving is executed. Therefore, the driver can select whether to execute the automatic driving.

With the embodiment, in the case where it is determined that the shift operation position Psh is indefinite and where the destination has been input to the navigation apparatus 75, the vehicle 10 travels to the destination. Therefore, the vehicle 10 can travel to the destination without stopping.

Next, an alternative embodiment of the disclosure will be described. In the following description, parts in common with the above-described embodiment are denoted by identical reference characters, and descriptions for the parts are omitted.

A limp home control device 100 (see a parenthesis in FIG. 2) constituting an electronic control device 98 (see a parenthesis in FIG. 2) in the embodiment functionally includes a traveling position determination device 102 (see a parenthesis in FIG. 2) to determine whether a road on which the vehicle 10 is currently traveling is a freeway in the case where the abnormality determination device 72 determines the occurrence of the detection abnormality that the shift operation position Psh becomes indefinite and where the destination has not been input to the navigation apparatus 75.

The traveling position determination device 102 determines whether the road on which the vehicle 10 is currently traveling is a freeway. The traveling position determination device 102 determines whether the road on which the vehicle 10 is traveling is a freeway, based on the current position of the vehicle 10 and road information stored in the navigation apparatus 75 in advance. In the case where the traveling position determination device 102 determines that the road on which the vehicle 10 is traveling is a general road, the limp home control device 100 executes the same control as the above-described embodiment. That is, the limp home control device 100, after temporarily stopping the vehicle 10, retrieves the temporary evacuation place similarly to the above-described embodiment, and displays the screen for selecting the temporary evacuation place, on the monitor 75a of the navigation apparatus 75, and the driver selects the temporary evacuation place. After the driver selects the temporary evacuation place, the limp home control device 100 sets the selected temporary evacuation place as the destination, and outputs the command to execute the automatic driving and automatic parking of the vehicle 10, to the automatic driving control device 68.

In the case where the traveling position determination device 102 determines that the road on which the vehicle 10 is traveling is a freeway, the temporary evacuation place retrieval device 84, during traveling, retrieves a predetermined temporary evacuation place set on the freeway, as a temporary destination, and during traveling, the display control device 74 displays the screen for selecting the temporary evacuation place, on the monitor 75a. The temporary evacuation selection determination device 86 determines whether the temporary evacuation place has been selected during traveling. When the temporary evacuation place has been selected by the driver, the limp home control device 100 outputs, to the automatic driving control device 68, a command to make the vehicle 10 automatically drive toward the temporary evacuation place set without stopping the vehicle 10. Therefore, the vehicle 10 travels in the limp home mode, toward the temporary evacuation place. For example, a service area closest to the current position is retrieved as the temporary evacuation place when the vehicle 10 is traveling on a freeway. In the case where the driver does not select the temporary evacuation place, the limp home control device 100 executes the follow-up traveling in which the vehicle 10 follows a vehicle traveling in front of the vehicle 10.

In the above example, when the temporary evacuation place such as a service area is retrieved, the driver selects whether the vehicle 10 travels to the temporary evacuation place, and thereafter, the vehicle 10 travels to the temporary evacuation place. However, when the temporary evacuation place is retrieved, the vehicle 10 may travel to the temporary evacuation place automatically without the driver's selection.

Figure 6:
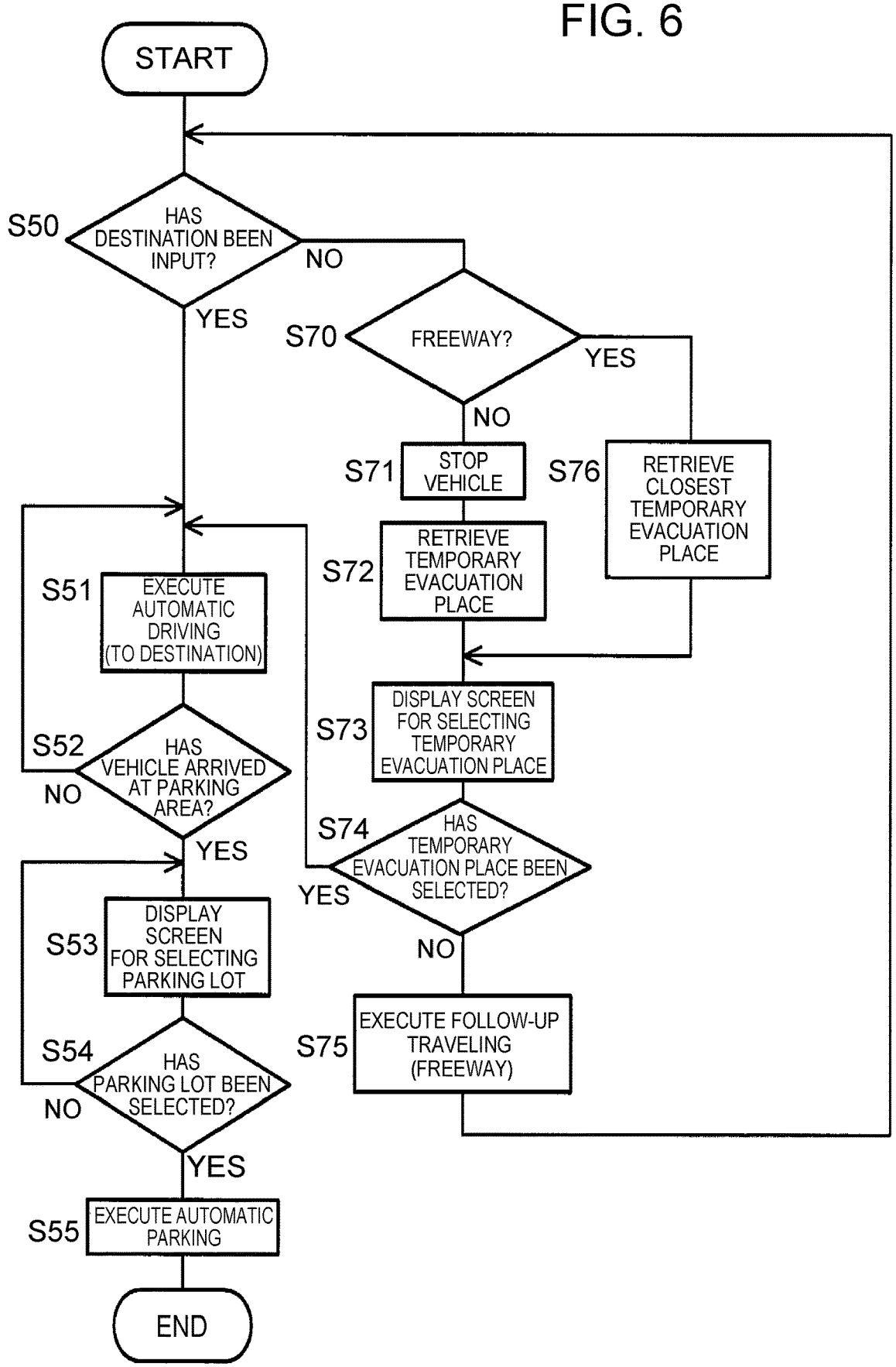
FIG. 6 is a flowchart for describing an alternative manner of the limp home control in the case where it is determined that the shift operation position is indefinite.

FIG. 6 is a flowchart corresponding to the alternative embodiment of the disclosure, and corresponds to FIG. 5 in the above-described embodiment. That is, FIG. 6 shows an alternative manner of the control operation (corresponding to S46 in FIG. 4) when the switching operation to the automatic driving is performed during traveling in the case of the occurrence of the detection abnormality by which the shift operation position Psh of the shift operation apparatus 46 becomes indefinite. The flowchart of FIG. 6 is different from the flowchart of FIG. 5 in the above-described embodiment, in control operations in step S70 and later (in S70 to S75) that are executed in the case where the destination has not been input in step S50. The control operations in step S70 and later will be described below.

In the case where the destination input determination device 80 determines that the destination has not been input in S50 of FIG. 6, the negative determination is made in S50, and the routine proceeds to S70. The traveling position determination device 102 determines whether the road on which the vehicle 10 is currently traveling is a freeway, in S70 corresponding to the control function of the traveling position determination device 102. In the case where the road on which the vehicle 10 is traveling is a general road, the negative determination is made in S70, and the limp home control device 100 temporarily stops the vehicle 10 on a road shoulder or the like, in S71 corresponding to the control function of the limp home control device 100.

In the case where the road is a general road, while the vehicle 10 is in the stop state, the temporary evacuation place retrieval device 84 retrieves the temporary evacuation place, in S72 corresponding to the control function of the temporary evacuation place retrieval device 84, and the display control device 74 displays the screen for selecting the temporary evacuation place, on the monitor 75a of the navigation apparatus 75, in S73 corresponding to the control function of the display control device 74. Then, the temporary evacuation selection determination device 86 determines whether the temporary evacuation place has been selected, in S74 corresponding to the control function of the temporary evacuation selection determination device 86. In the case where the temporary evacuation place has been selected, the control operations in S51 to S55 are executed, and the automatic driving of the vehicle 10 to the temporary evacuation place is executed.

In the case where the road on which the vehicle 10 is traveling is a freeway in S70, the temporary evacuation place retrieval device 84 retrieves the temporary evacuation place during traveling, in S76 corresponding to the control operation of the temporary evacuation place retrieval device 84, and the display control device 74, in S73, displays the screen for selecting the temporary evacuation place, on the monitor 75a. Further, the selection of the temporary evacuation place is permitted even during traveling. When the temporary evacuation place is selected by the driver, the positive determination is made in S74, and the routine proceeds to S51, so that the automatic driving of the vehicle 10 to the temporary evacuation place is executed. On the other hand, in the case where the temporary evacuation place is not selected in S74, the negative determination is made in S74, and the limp home control device 100 executes the follow-up traveling in which the vehicle 10 follows a vehicle traveling in front of the vehicle 10, in S75. Accordingly, even in the case where the temporary evacuation place is not selected, the traveling is continued.

After the temporary evacuation place (a service area or the like) is retrieved in S76, the automatic driving of the vehicle 10 to the retrieved temporary evacuation place may be automatically executed while the driver does not select the temporary evacuation place. That is, S73 and S74 may be omitted.

When the vehicle 10 stops on a road shoulder or the like during the traveling on a freeway, there is a high possibility of the rear-end collision of a following vehicle. Hence, during the traveling on a freeway, the vehicle 10 does not stop, and travels to the temporary evacuation place. Thereby, it is possible to prevent the rear-end collision of a following vehicle.

As described above, with the embodiment, it is possible to obtain the same effect as the above-described embodiment. In the embodiment, in the case where the abnormality determination device 120 determines the detection abnormality has occurred during the traveling on a freeway, the vehicle 10 travels toward the temporary evacuation place such as a service area set on the freeway. Therefore, the vehicle 10 can continuously travel to a safe place without stopping in the middle of the freeway.

In the above-described embodiments, the abnormality determination device 72 determines whether the shift operation position Psh is indefinite, based on the abnormality of the Hall ICs 49 of the shift operation apparatus 46. As another reason why the shift operation position Psh becomes indefinite, there can be a failure of the shift-by-wire ECU 56. In this case also, by the detection abnormality, the shift operation position Psh switched by the shift operation apparatus 46 cannot be detected. Hence, an abnormality determination device 120 (see the parenthesis in FIG. 2) functionally included in an electronic control apparatus 124 in the embodiment determines whether the detection abnormality of the shift operation position Psh that is switched by the shift operation apparatus 46 has occurred, based on whether the abnormality has occurred in the shift-by-wire ECU 56. The shift-by-wire ECU 56 and the actuator 28 are examples of the shift control unit in the disclosure.

The abnormality determination device 120 determines the abnormality of the shift-by-wire ECU 56. The abnormality determination device 120 determines that the abnormality of the shift-by-wire ECU 56 has occurred, for example, in the case where the abnormality is detected based on an abnormality detection circuit (self-check circuit) functionally included in the shift-by-wire ECU 56. Further, the abnormality determination device 120 determines that the abnormality of the shift-by-wire ECU 56 has occurred, in the case where the shift-by-wire ECU 56 does not output the shift signal Sshift to the HV-ECU 54 in the shift operation of the shift operation apparatus 46. In the case of the occurrence of the abnormality of the shift-by-wire ECU 56, it is difficult to actuate the parking lock mechanism 29 through the actuator 28 and switch the traveling range of the vehicle 10 to the parking range. In addition, there is a case that it is determined that the abnormality of the shift-by-wire ECU 56 has occurred due to an abnormality of the actuator 28. That is, when the abnormality of the shift-by-wire ECU 56 has occurred, it is difficult to fix the vehicle 10 such that the vehicle 10 cannot be moved after the stop of the vehicle 10.

In the case where the abnormality determination device 120 determines that the abnormality of the shift-by-wire ECU 56 has occurred, a limp home control device 122 (see the parenthesis in FIG. 2) in the embodiment makes the vehicle 10 travel to the destination by the automatic driving and makes the vehicle 10 park into a predetermined parking lot, similarly to the above-described embodiment. Incidentally, even in the case where the shift-by-wire ECU 56 has failed, the vehicle 10 can travel based on the drive power command signal Sdrive from the automatic driving ECU 64.

At the time of the parking of the vehicle 10, the limp home control device 122 actuates the electric parking brake 47, instead of the parking lock mechanism 29. In the case of the abnormality of the shift-by-wire ECU 56, there is a possibility that the signal for actuating the parking lock mechanism 29 is not output from the shift-by-wire ECU 56 and the parking lock mechanism 29 is not normally actuated. In response, in the case where the abnormality determination device 120 determines that the abnormality of the shift-by-wire ECU 56 has occurred, the limp home control device 122 actuates the electric parking brake 47 at the time of the parking of the vehicle 10. Thus, in the case where the abnormality of the shift-by-wire ECU 56 has occurred, the fixation of the vehicle 10 after the stop is performed by the electric parking brake 47, and thereby, it is possible to prohibit the movement of the vehicle 10 after the parking. The electric parking brake 47 is actuated by a signal that is output from the brake ECU 60, and therefore, it is possible to actuate the electric parking brake 47 even when the abnormality has occurred in the shift-by-wire ECU 56.

When the vehicle 10 is parked on a road having a gradient that is exceeding an allowable gradient of the electric parking brake 47, there is a possibility that the vehicle 10 moves against the braking power of the electric parking brake 47. Hence, the limp home control device 122 surely prevents the movement of the vehicle 10 after the parking, by selecting a place having a small gradient as the parking place.

Figure 7:
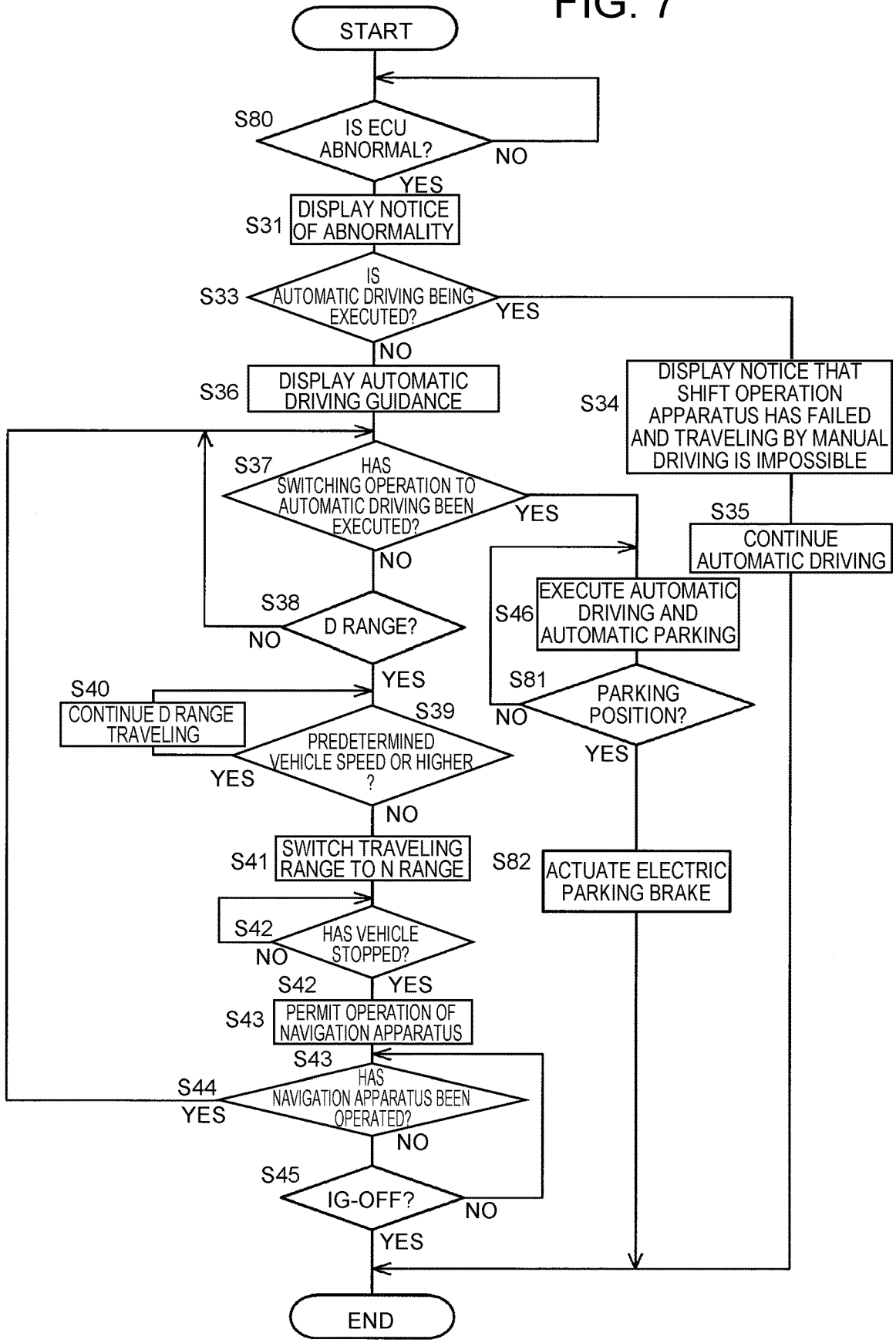
FIG. 7 is a flowchart for describing a control operation of the electronic control apparatus in the case where the detection abnormality of the shift operation position occurs due to an abnormality of a shift-by-wire ECU.

FIG. 7 is a flowchart for describing a control operation of the electronic control apparatus 124 in the case where the detection abnormality of the shift operation position Psh has occurred due to the abnormality of the shift-by-wire ECU 56. FIG. 7 corresponds to FIG. 4 in the above-described embodiment. The same control functions as those in the flowchart of FIG. 4 are denoted by the same step numerals, and detailed descriptions for the control functions are omitted.

In FIG. 7, the abnormality determination device 120 determines whether the abnormality has occurred in the shift-by-wire ECU 56, in S80 corresponding to the control function of the abnormality determination device 120. In the case where the abnormality determination device 120 determines that the abnormality of the shift-by-wire ECU 56 has not occurred, the routine returns to S80, and the abnormality determination device 120 continuously determines whether the abnormality of the shift-by-wire ECU 56 has occurred. In the case where the abnormality determination device 120 determines that the abnormality of the shift-by-wire ECU 56 has occurred, the positive determination is made in S80, and the display control device 74 displays a notice of the occurrence of the abnormality of the shift-by-wire ECU 56, on the instrument panel 77, in S31 corresponding to the control function of the display control device 74. Thereby, the driver can recognize the abnormality of the shift-by-wire ECU 56.

The automatic driving determination device 76 determines whether the automatic driving is being executed in S33 corresponding to the control function of the automatic driving determination device 76. In the case where the automatic driving is being executed, S34 and S35 are executed, so that the automatic driving is continuously executed. In the case where the manual driving is being executed, the negative determination is made in S33. In S36, the display control device 74 displays the notice (automatic driving guidance display) that the switching from the manual driving to the automatic driving is needed, on the instrument panel 77, and in S37, the switching determination device 78 determines whether the switching operation to the automatic driving has been executed by the driver.

In the case where the switching operation to the automatic driving has not been executed, the negative determination is made in S37, and the control operations in S38 to S45 are executed. In S38 to S45, the same control operations as those in the above-described embodiment are executed, and therefore, descriptions for the control operations are omitted. In the case where the positive determination is made in S37, the automatic driving of the vehicle 10 to the destination and the automatic parking of the vehicle 10 into a predetermined parking lot are executed in S46. Next, the limp home control device 122 determines whether the vehicle 10 has stopped in the predetermined parking lot, in S81 corresponding to the control function of the limp home control device 122. In the case where the vehicle 10 has stopped in the parking lot, the positive determination is made in S81, and the limp home control device 122 actuates the electric parking brake 47, in S82 corresponding to the control function of the limp home control device 122. Thereby, even when the parking lock mechanism 29 is not actuated due to the abnormality of the shift-by-wire ECU 56, the electric parking brake 47 is actuated, so that the stop state of the vehicle 10 after the parking is maintained.

As described above, with the embodiment, it is possible to obtain the same effect as the above-described embodiment. In the embodiment, in the case where the abnormality determination device 120 determines that the abnormality of the shift-by-wire ECU 56 has occurred, the parking operation is executed by the electric parking brake 47. Therefore, even when the parking lock mechanism 29 is not actuated due to the failure of the shift-by-wire ECU 56, it is possible to prevent the movement of the vehicle 10 after the parking.

Thus, the embodiments of the disclosure have been described in detail based on the drawings. The disclosure can be applied to other modes.

For example, the above-described embodiments do not always need to be realized independently, and may be combined when appropriate. For example, both the abnormality of the Hall ICs 49 and the abnormality of the shift-by-wire ECU 56 may be determined.

In the above-described embodiments, the automatic driving control is a control for executing a fully automatic driving in which the steering angle of the steering wheel 30, the drive power and the braking power are controlled. However, the disclosure is not always limited to the fully automatic driving, and the automatic driving may be executed for some functions such as assists of the steering wheel 30, the accelerator pedal and the brake pedal.

In the above-described embodiments, after the vehicle 10 arrives at the destination in the limp home mode, the automatic parking control is executed. However, the automatic parking control does not always need to be executed.

In the above-described embodiments, in the case where the destination is not input, the vehicle 10 is temporarily stopped, the temporary evacuation place is retrieved, and the automatic driving of the vehicle 10 to the retrieved temporary evacuation place is executed. However, the destination may be directly input when the vehicle 10 is stopped. Further, the temporary evacuation place may be selected from a driver's home, a dealer, a repair shop and the like.

In the above-described embodiments, the electronic control apparatus 52 is configured to include the HV-ECU 54, the shift-by-wire ECU 56, the steering ECU 58, the brake ECU 60 and the automatic driving ECU 64. However, these ECUs do not always need to be provided separately, and modifications may be made when appropriate. For example, the HV-ECU 54 and the shift-by-wire ECU 56 may be configured as a single ECU. Further, all ECUs may be configured as a single ECU.

In the above-described embodiments, in the case where the detection abnormality by which the shift operation position Psh becomes indefinite while the vehicle 10 is traveling, the vehicle 10 is stopped on a road shoulder or the like, and then the temporary evacuation place is selected. However, the vehicle 10 does not always need to be stopped on a road shoulder. For example, the temporary evacuation place may be selected when the vehicle 10 stops at a traffic light.

In the above-described embodiments, it is determined that the detection abnormality by which the shift operation position Psh becomes indefinite has occurred, in the case where two of the Hall ICs 49 have failed. However, it may be determined that the shift operation position Psh is indefinite, in the case where one of the Hall ICs 49 has failed. When one of the Hall ICs 49 has failed, the limp home control is quickly executed by the limp home control device 70, so that a high safety is secured.

In the above-described embodiments, the vehicle 10 is a hybrid vehicle configured to include the engine 12 and the shift transmission device 14. However, the disclosure is not always limited to the hybrid vehicle. For example, the vehicle 10 may be an electric vehicle that uses a motor as a drive source, and the shift transmission device 14 does not always need to be provided. In other words, the disclosure can be appropriately applied to any vehicle that can travel without depending on the operation of the shift operation apparatus 46 by the driver.

In the above-described embodiments, when the occurrence of the detection abnormality of the shift operation apparatus 46 is determined, the vehicle 10 travels to the destination as the limp home control. However, when the occurrence of the detection abnormality of the shift operation apparatus 46 is determined, the follow-up traveling in which the vehicle 10 travels while following a vehicle that is traveling in front of the vehicle 10 may be executed as the limp home control.

The above-described embodiments are just examples, and the disclosure can be carried out while various alterations and modifications are made based on the knowledge of a person skilled in the art.

What is claimed is:

1. A control apparatus for a vehicle comprising:
a control device configured to switch a traveling range of the vehicle based on an operation position of a shift operation apparatus operated by a driver of the vehicle, the operation position being detected by an operation position detection apparatus;

an abnormality determination device configured to determine that a detection abnormality of the operation position detection apparatus has occurred; and a limp home control device configured to execute a limp home control in a case where the abnormality determination device determines that the detection abnormality of the operation position detection apparatus has occurred during vehicle traveling, the limp home control being a control by which the vehicle travels without depending on operation of the shift operation apparatus, wherein the limp home control device is configured to continue automatic driving in a case where the abnormality determination device determines that the detection abnormality of the operation position detection apparatus has occurred during the automatic driving.

2. The control apparatus according to claim 1, further comprising a notification device configured to notify the driver that the limp home control is able to be executed, in a case where the abnormality determination device determines that the detection abnormality of the operation position detection apparatus has occurred, wherein the limp home control device is configured to execute the limp home control after the notification by the notification device.

3. The control apparatus according to claim 1, further comprising:

a stop state determination device configured to determine whether the vehicle is in a stop state, in a case where the abnormality determination device determines that the detection abnormality of the operation position detection apparatus has occurred; and an input permission device configured to permit input of a destination in the limp home control when the stop state determination device determines that the vehicle is in the stop state, wherein the limp home control device is configured to, when the destination is input, make the vehicle travel to the input destination.

4. The control apparatus according to claim 1, further comprising a switching determination device configured to determine whether a switching to the automatic driving has been performed by the driver after the abnormality determination device has determined that the detection abnormality of the operation position detection apparatus has occurred, wherein the limp home control device is configured to make the vehicle travel by the automatic driving when the switching determination device determines that the switching to the automatic driving has been performed.

5. The control apparatus according to claim 1, further comprising a pathway guidance apparatus configured to set a traveling pathway to a destination, wherein the limp home control device is configured to, when the destination is input to the pathway guidance apparatus, make the vehicle travel to the input destination in a case where the abnormality determination device determines that the detection abnormality of the operation position detection apparatus has occurred.

6. The control apparatus according to claim 3, further comprising a pathway guidance apparatus configured to set a traveling pathway to the destination, wherein the limp home control device is configured to, when the destination is input to the pathway guidance apparatus, make the vehicle travel to the input destination in a case where the abnormality determination device determines that the detection abnormality of the operation position detection apparatus has occurred.

7. The control apparatus according to claim 1, wherein the limp home control device is configured to retrieve a temporary evacuation place in a case where the abnormality determination device determines that the detection abnormality of the operation position detection apparatus has occurred.

8. The control apparatus according to claim 7, further comprising a traveling position determination device configured to determine whether a road on which the vehicle is traveling is a freeway, wherein the limp home control device is configured to make the vehicle travel toward the temporary evacuation place set on the freeway, when the traveling position determination device determines that the road on which the vehicle is traveling is the freeway.

9. The control apparatus according to claim 1, wherein the limp home control device is configured to perform a fixation of the vehicle after a stop with an electric parking brake, in a case where the abnormality determination device determines that the detection abnormality of the operation position detection apparatus has occurred due to an abnormality of a shift control unit that executes a switching control for the traveling range of the vehicle.

10. The control apparatus according to claim 9, wherein the shift control unit is configured to actuate a parking lock mechanism that mechanically stops rotation of a drive wheel and switch the traveling range of the vehicle to a parking range.

11. The control apparatus according to claim 1, wherein the limp home control executes an automatic driving control based on destination information and current position information.

12. A control apparatus for a vehicle comprising:

a control device configured to switch a traveling range of the vehicle based on an operation position of a shift operation apparatus operated by a driver of the vehicle, the operation position being detected by an operation position detection apparatus;

an abnormality determination device configured to determine that a detection abnormality of the operation position detection apparatus has occurred;

a limp home control device configured to execute a limp home control in a case where the abnormality determination device determines that the detection abnormality of the operation position detection apparatus has occurred during vehicle traveling, the limp home control being a control by which the vehicle travels without depending on operation of the shift operation apparatus;

a stop state determination device configured to determine whether the vehicle is in a stop state, in a case where the abnormality determination device determines that the detection abnormality of the operation position detection apparatus has occurred; and an input permission device configured to permit input of a destination in the limp home control when the stop state determination device determines that the vehicle is in the stop state, wherein the limp home control device is configured to, when the destination is input, make the vehicle travel to the input destination.

13. A control apparatus for a vehicle comprising:

a control device configured to switch a traveling range of the vehicle based on an operation position of a shift operation apparatus operated by a driver of the vehicle, the operation position being detected by an operation position detection apparatus;

an abnormality determination device configured to determine that a detection abnormality of the operation position detection apparatus has occurred;

a limp home control device configured to execute a limp home control in a case where the abnormality determination device determines that the detection abnormality of the operation position detection apparatus has occurred during vehicle traveling, the limp home control being a control by which the vehicle travels without depending on operation of the shift operation apparatus; and a switching determination device configured to determine whether a switching to the automatic driving has been performed by the driver after the abnormality determination device has determined that the detection abnormality of the operation position detection apparatus has occurred, wherein the limp home control device is configured to make the vehicle travel by the automatic driving when the switching determination device determines that the switching to the automatic driving has been performed.

\* \* \* \* \*